United States Patent
Seal et al.

(10) Patent No.: US 6,401,963 B1
(45) Date of Patent: *Jun. 11, 2002

(54) HIGH PERFORMANCE, THIN METAL LINED, COMPOSITE OVERWRAPPED PRESSURE VESSEL

(75) Inventors: Ellis C. Seal, Bay St. Louis, MS (US); Norman C. Elfer, Pearl River, LA (US); Torben Brandt, Burbank; Robert O. Edman, Torance, both of CA (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,602

(22) Filed: Oct. 16, 1998

Related U.S. Application Data

(60) Division of application No. 08/681,147, filed on Jul. 22, 1996, now Pat. No. 5,822,838, which is a continuation-in-part of application No. 08/595,371, filed on Feb. 1, 1996, now abandoned.

(51) Int. Cl.$^7$ .............................................. B65H 81/00
(52) U.S. Cl. ........................ 220/586; 220/589; 220/590
(58) Field of Search ................................. 220/581, 586, 220/588, 589, 590

(56) References Cited

U.S. PATENT DOCUMENTS

| | | | |
|---|---|---|---|
| 2,809,762 A | | 10/1957 | Cardona ...................... 220/590 |
| 3,131,725 A | | 5/1964 | Chyle ..................... 220/586 X |
| 3,137,405 A | | 6/1964 | Gorcey ........................ 220/590 |
| 3,184,092 A | * | 5/1965 | George ........................ 220/589 |
| 3,207,352 A | | 9/1965 | Reinhart, Jr. ................ 220/589 |
| 3,240,644 A | | 3/1966 | Wolff ..................... 220/590 X |
| 3,321,347 A | | 5/1967 | Price et al. ............. 220/590 X |
| 3,504,820 A | * | 4/1970 | Barthel ........................ 220/588 |
| 3,815,773 A | | 6/1974 | Duvall et al. ................ 220/590 |
| 3,843,010 A | * | 10/1974 | Morse et al. ................ 220/590 |
| 3,969,812 A | | 7/1976 | Beck ..................... 220/590 X |
| 4,053,081 A | | 10/1977 | Minke ..................... 220/590 X |
| 4,225,051 A | | 9/1980 | Faudou et al. ............... 220/590 |
| 4,369,894 A | | 1/1983 | Grover et al. ............... 220/590 |
| 4,835,975 A | * | 6/1989 | Windecker ............... 220/590 X |
| 5,228,585 A | | 7/1993 | Lutgen et al. .......... 220/586 X |
| 5,284,996 A | | 2/1994 | Vickers .................. 220/590 X |
| 5,287,988 A | * | 2/1994 | Murray .................... 220/590 X |
| 5,341,638 A | | 8/1994 | Van Name et al. ..... 220/589 X |
| 5,385,262 A | * | 1/1995 | Coquet et al. .......... 220/588 X |
| 5,385,263 A | * | 1/1995 | Kirk et al. .............. 220/586 X |
| 5,822,838 A | * | 10/1998 | Seal et al. .................. 29/469.5 |

* cited by examiner

*Primary Examiner*—Steven Pollard
(74) *Attorney, Agent, or Firm*—Garvey, Smith, Nehrbass & Doody, L.L.C.

(57) ABSTRACT

An innovative technology for composite overwrapped pressure vessels (COPVs) has been developed which significantly increases cost effectiveness, increases reliability, and reduces weight over state-of-the-art COPVs. This technology combines an innovative thin liner made of a metal having a high modulus of elasticity and a high ductility, a high-performance composite overwrap and a high-performance film adhesive at the overwrap/liner interface. The metal liner can be fabricated from readily available titanium alloy sheet and plate using a combination of spin forming and machining to fabricate components and electron-beam welding for tank assembly. The composite overwrap is filament-wound onto an adhesive-covered titanium liner and the overwrap and adhesive are co-cured in an oven to yield an integrated tank structure.

33 Claims, 13 Drawing Sheets

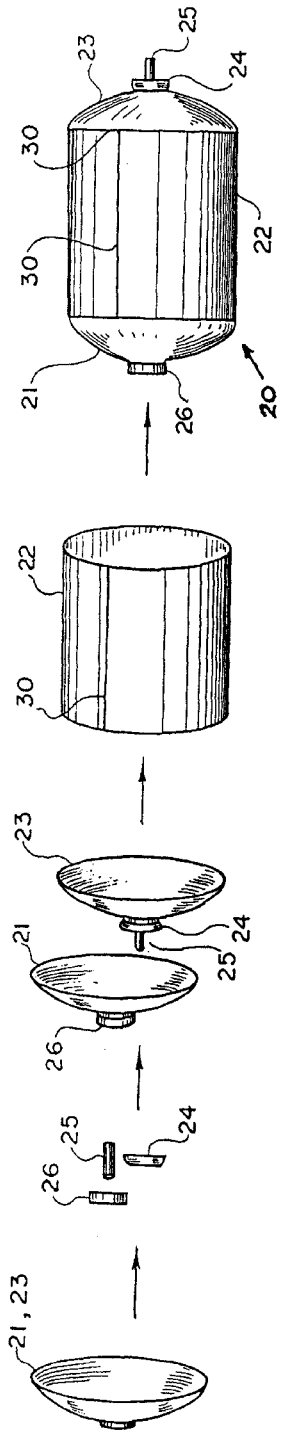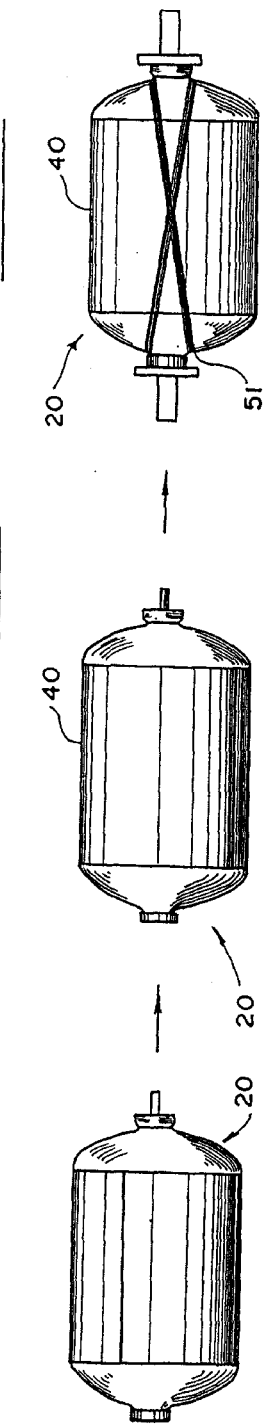

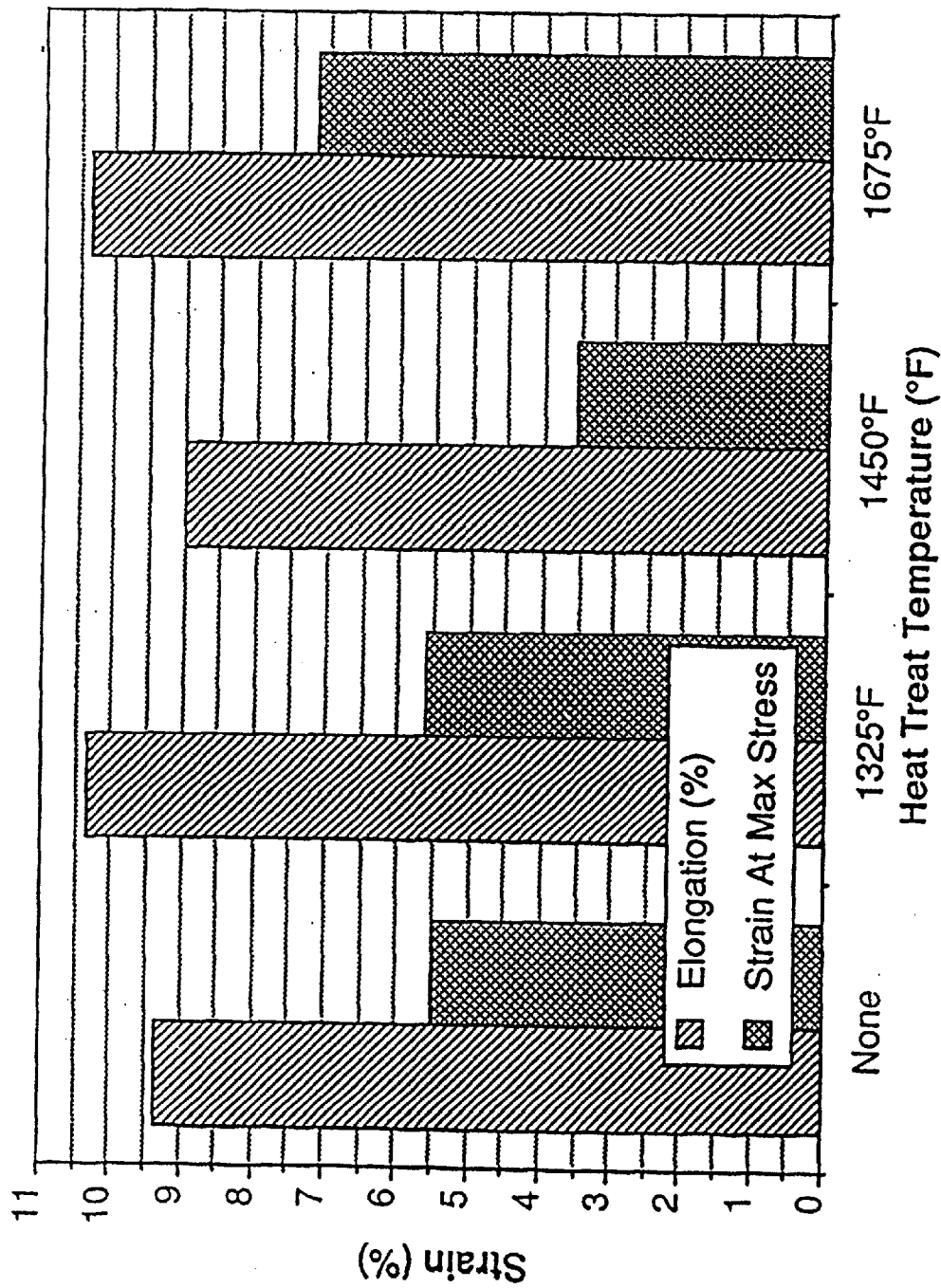

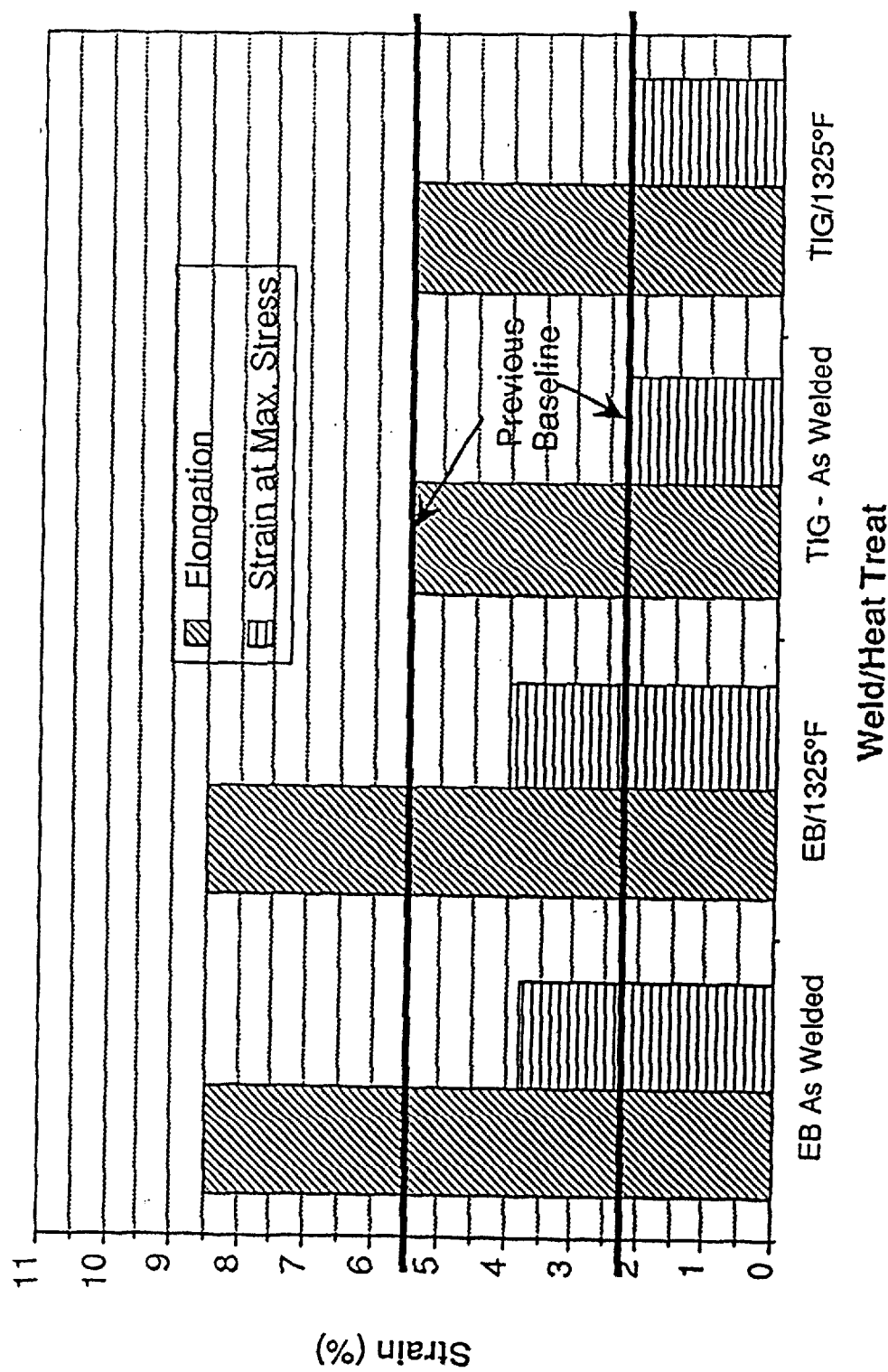

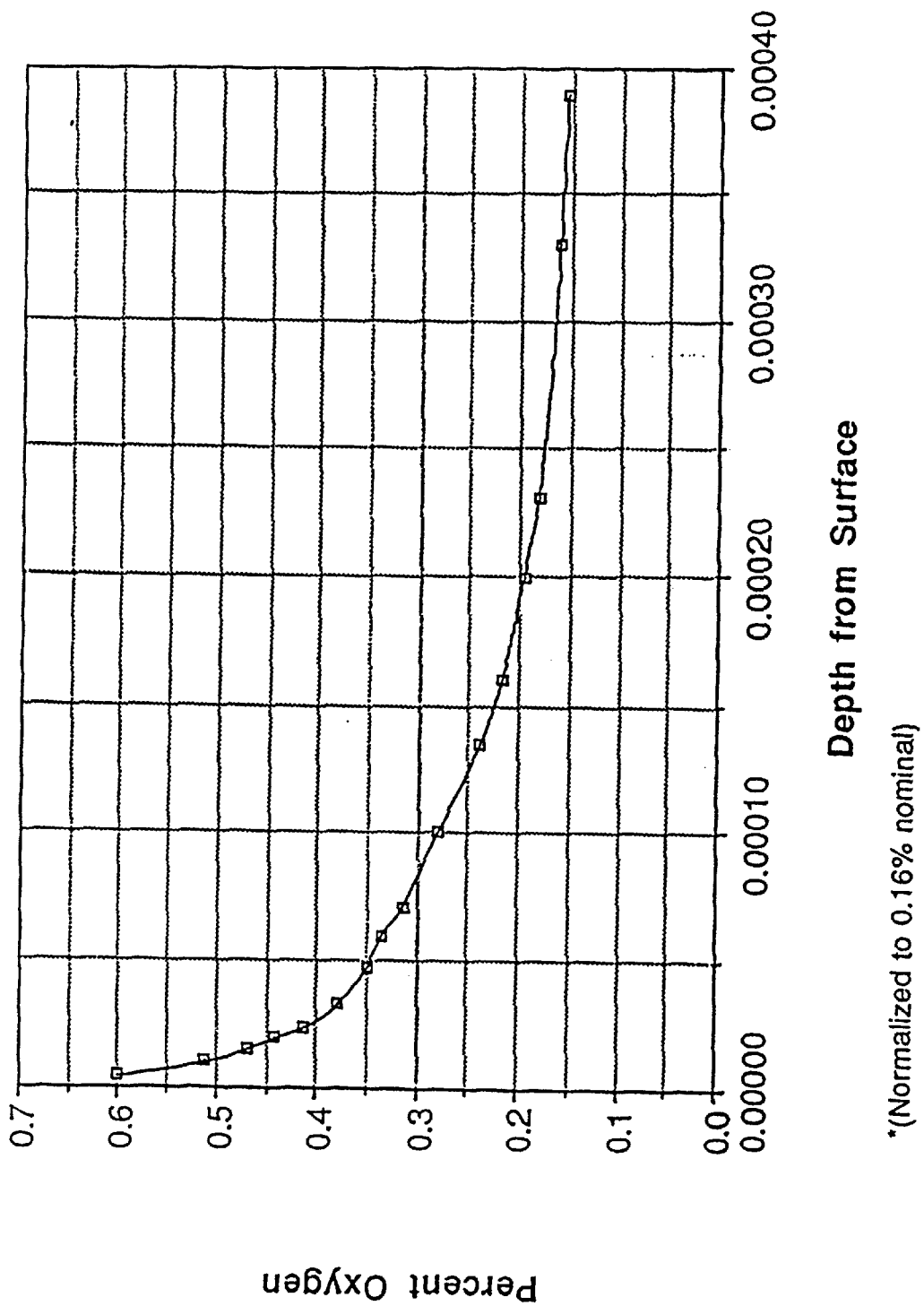

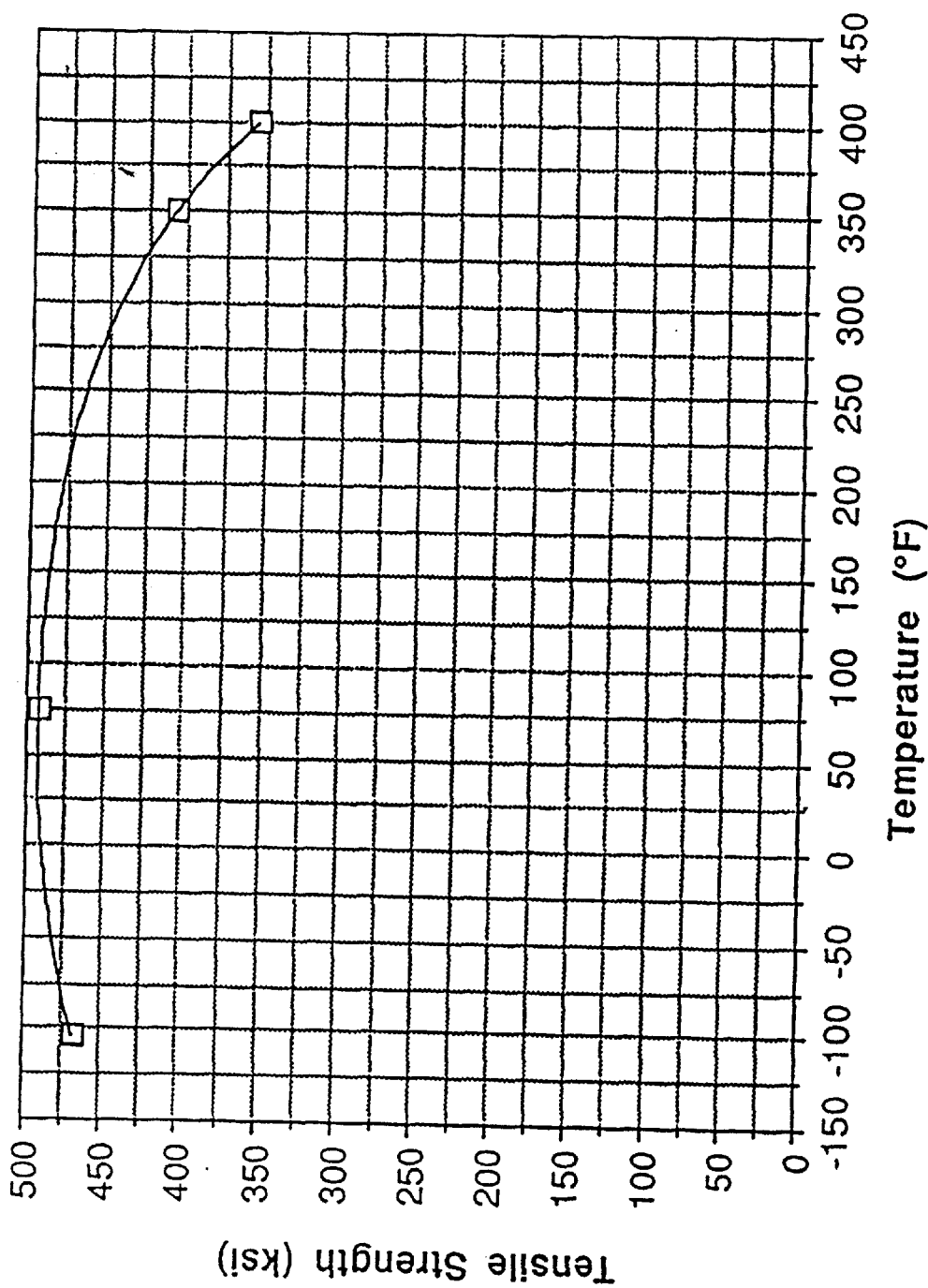

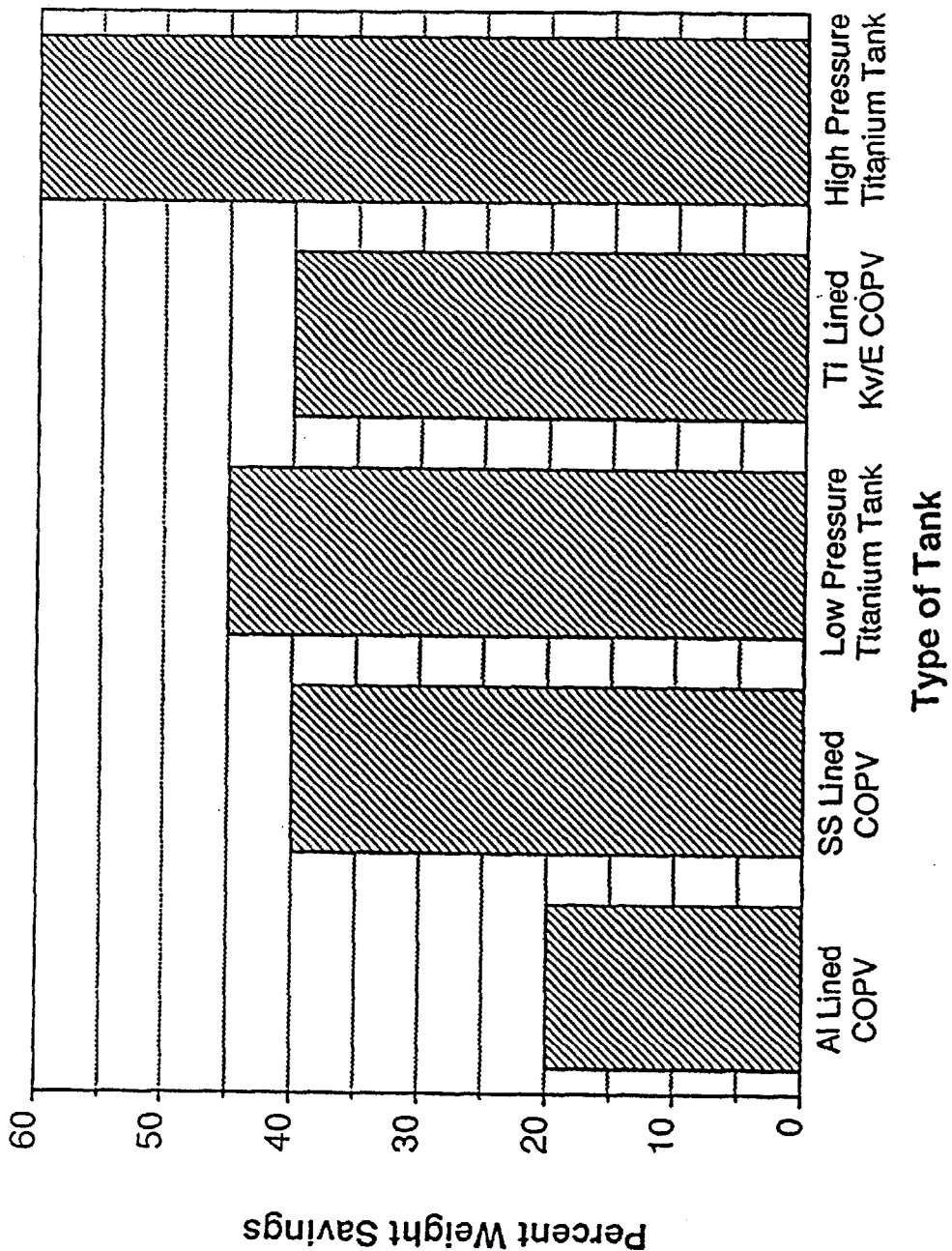

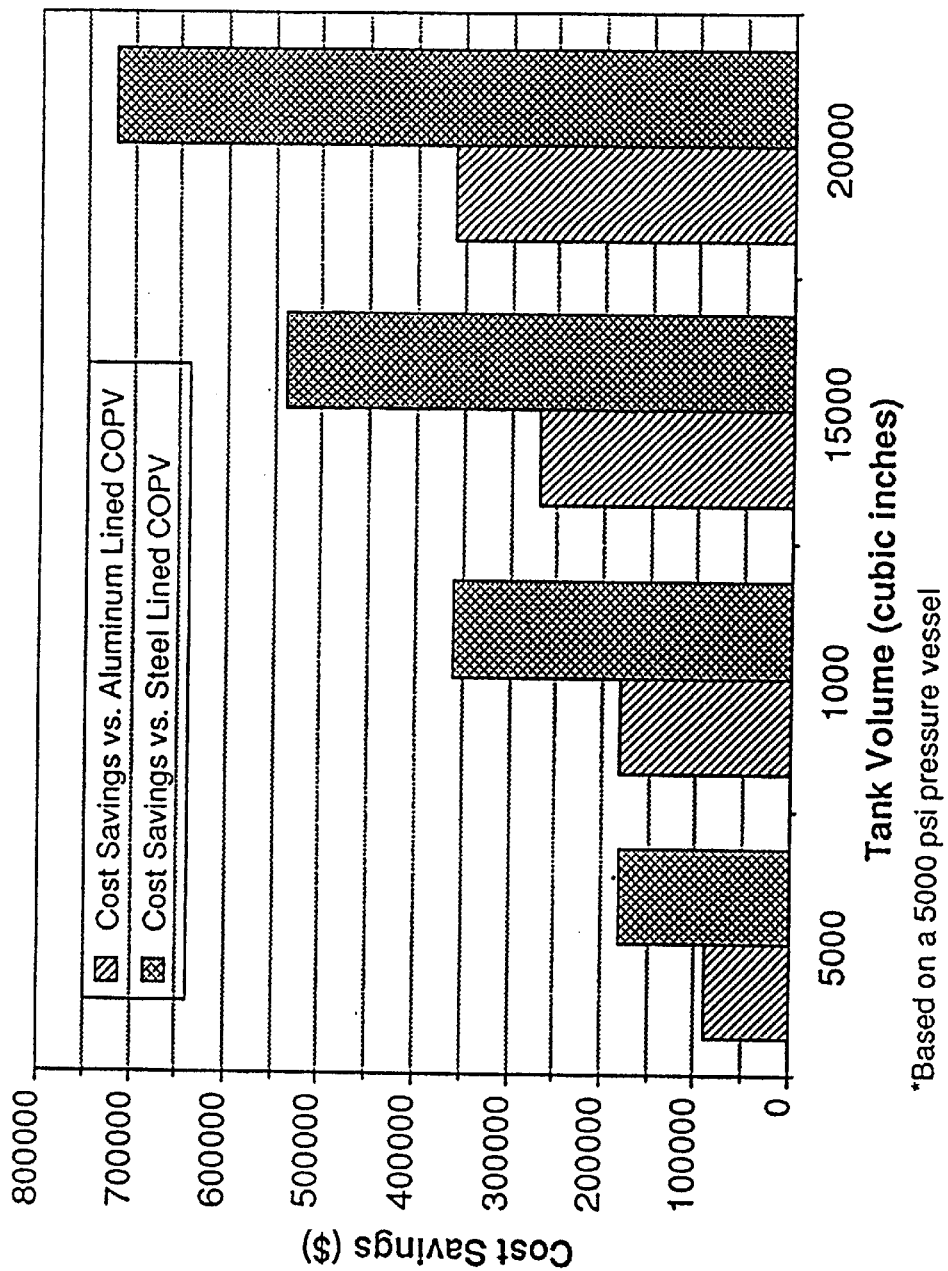

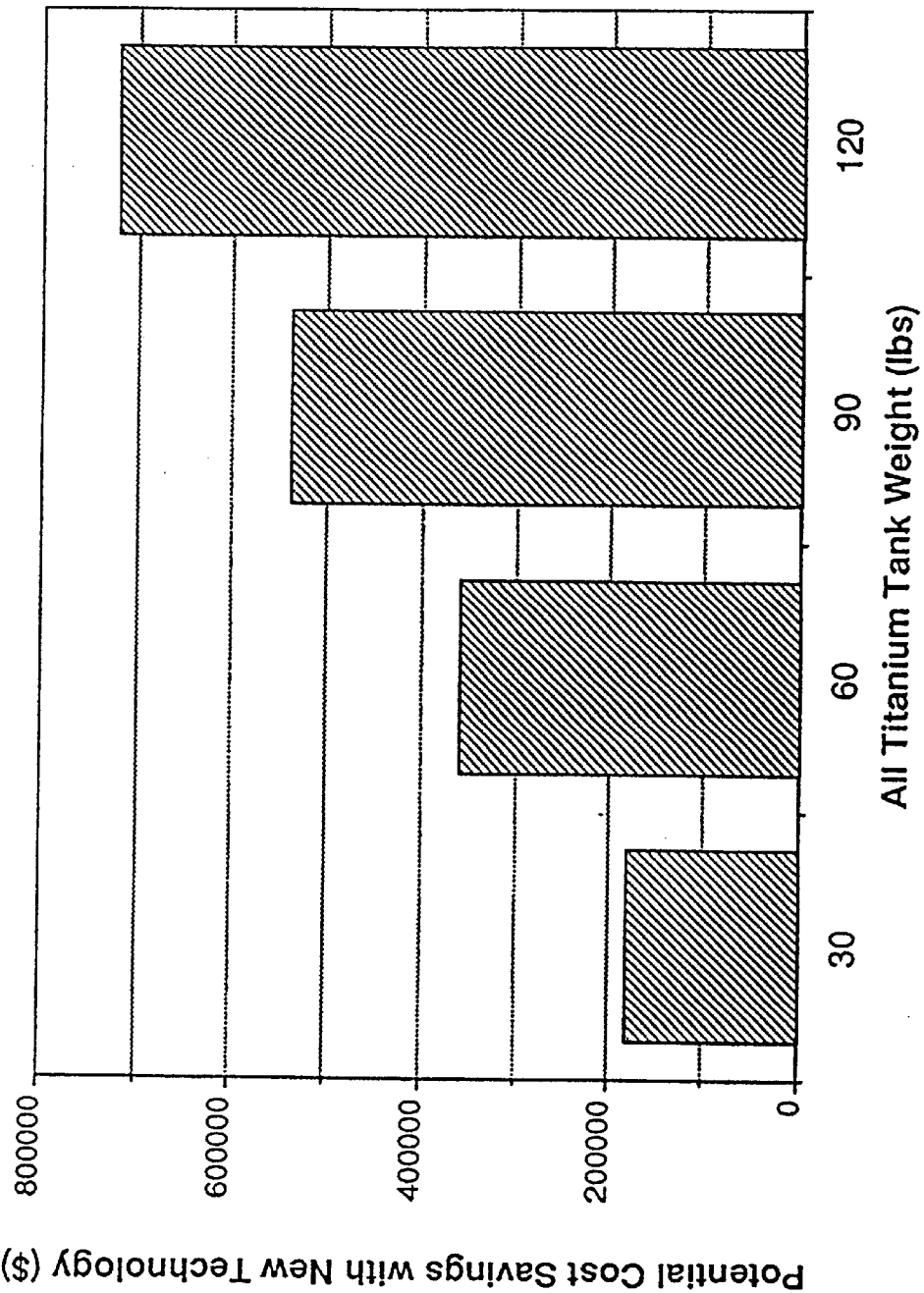

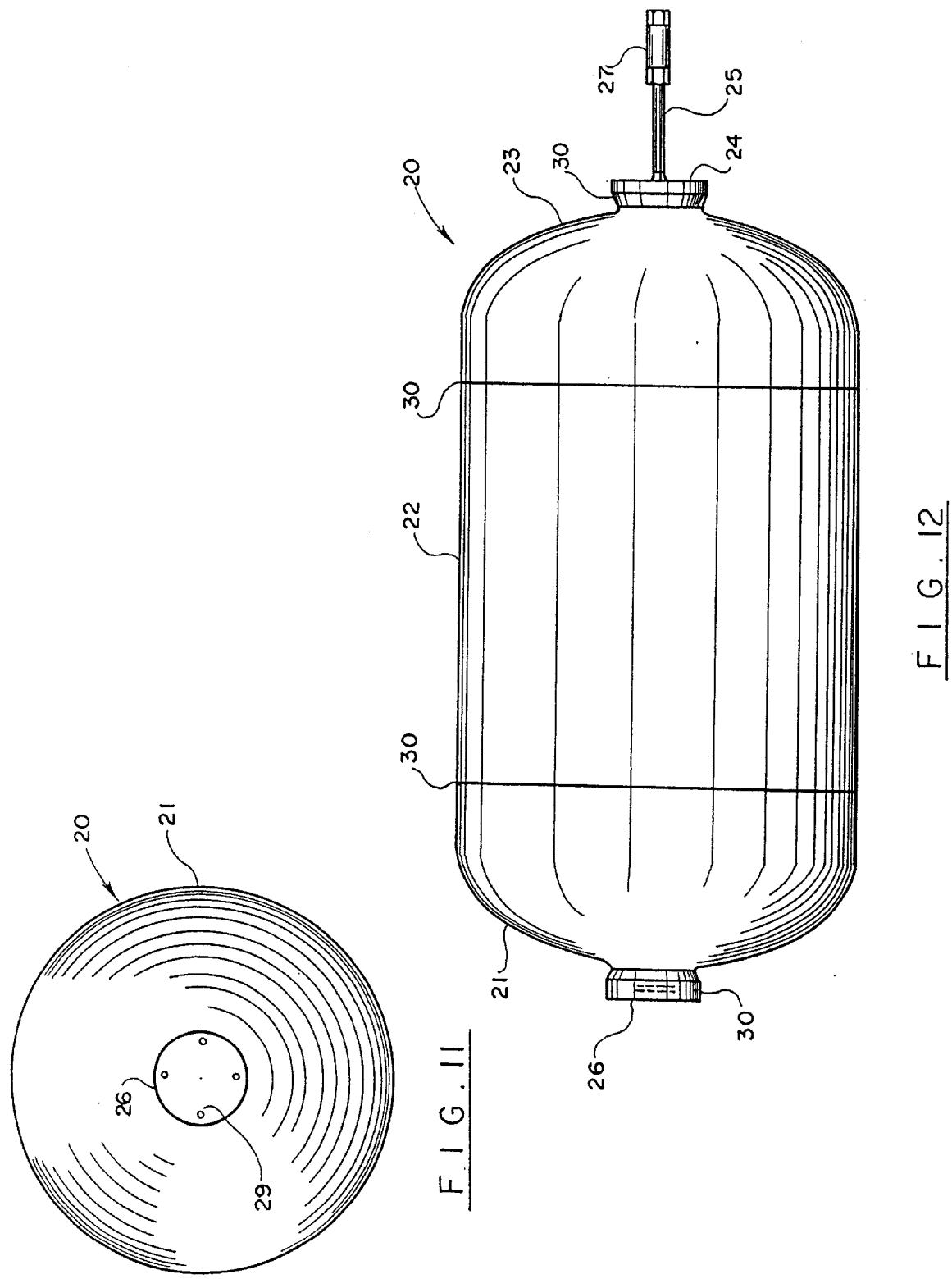

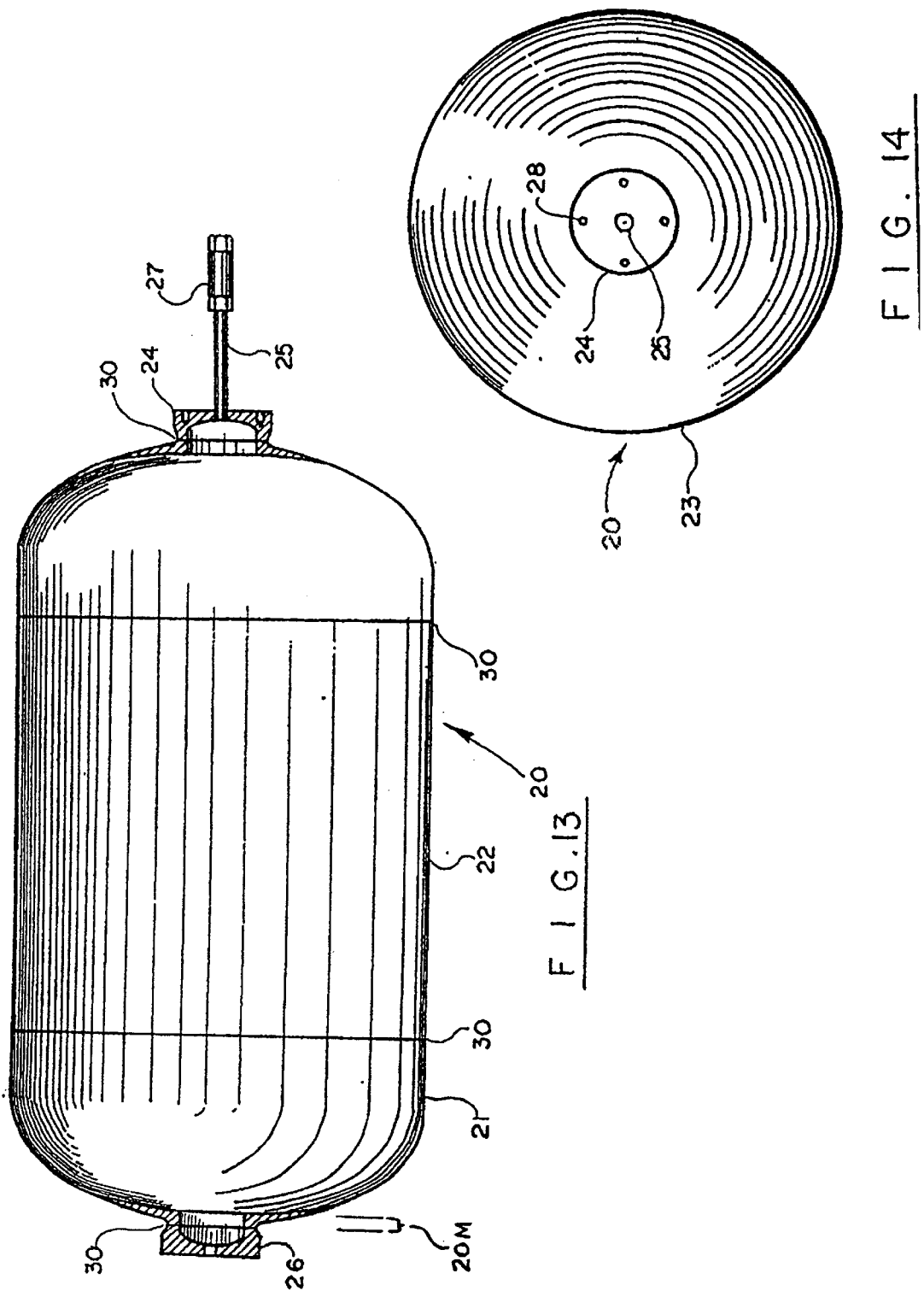

HIGH PERFORMANCE, THIN METAL LINED, COMPOSITE OVERWRAPPED PRESSURE VESSEL

CROSS-REFERENCE TO RELATED APPLICATIONS

This is a division of U.S. patent application Ser. No. 08/681,147, filed Jul. 22, 1996, now U.S. Pat. No. 5,822,838, which is a continuation-in-part of U.S. patent application Ser. No. 08/595,371, filed Feb. 1, 1996 now abandoned, and incorporated herein by reference.

BACKGROUND OF THE INVENTION

1. Field of the Invention

The present invention relates to composite overwrapped pressure vessels (COPV's) and their method of manufacture. More specifically, the present invention relates to high-performance COPV's including liners made of metals which exhibit high moduli of elasticity and high ductility, such as titanium alloys.

2. General Background

The basic technology for composite overwrapped pressure vessels with metal liners dates back to the late 60's and early 70's.

High-performance fibers offer very high strength-to-weight ratios and are ideal for making lightweight pressure vessels. However, composite laminates fabricated with these fibers have relatively high permeability and cannot contain high pressure liquids or gasses or low pressure gasses for extended periods of time. Therefore, composite pressure vessels must have a liner to prevent leakage. The tank efficiency, as measured by its pressure multiplied by its volume divided by its weight (PV/W), increases as the liner weight decreases. For low pressure and/or liquid containment, elastomeric or polymeric liners are used—these liners are strictly non-structural. For high pressure or gas containment, metal liners are typically used. Metal liners may be structural or non-structural.

For lightweight, high-pressure gas containment, there are basically two primary technologies (a) graphite/epoxy composite with a yielding aluminum liner, and (b) Kevlar/epoxy with load-sharing liners (typically stainless steel, titanium alloy, or inconel). The aluminum-lined, graphite/epoxy tank is the most prevalent technology, but it has limitations. First, the liner yields on each pressure cycle because the strain capability of the fibers is much higher than the elastic capability of the liner. This limits cycle life to around 100 cycles (depending on the specific design) and means that the liner is basically non-structural—it adds weight and a permeation barrier but very little load-carrying capability. PV/W (burst pressure of the tank in p.s.i. times volume in cubic inches, divided by weight in pounds) for these tanks is typically about $1.0 \times 10^6$ in. These liners are typically spun from sheet metal or machined from forgings. The spun tanks typically have welded fittings at the ends of the tanks where the forged tanks typically are made in two halves and welded at the center.

The second type of tank makes use of a liner which has a higher elastic range and remains elastic during operating pressure cycles. FIG. 1 shows a comparison of liners which undergo plastic deformation each cycle (copper and aluminum) as compared to an elastic liner (titanium). This means the tank has the potential to be more efficient; however, because of the density of these materials and the thicknesses required for processing, the efficiency of these tanks is also about $1.0 \times 10^6$ in. These load-sharing lined tanks typically have much higher cycle life, but are also typically are much more expensive than aluminum-lined tanks because of the materials and manufacturing processes required, e.g. machining thick, expensive titanium forgings.

SUMMARY OF THE PRESENT INVENTION

The present invention is a COPV with a high PV/W (preferably at least 1.05 million inches, more preferably at least 1.25 million inches, and even more preferably at least 1.45 million inches, more preferably at least 1.80 million inches, and most preferably at least 2.00 million inches). The present invention is able to achieve such a high PV/W in part because it uses a liner made of a high-strength metal which has a low modulus of elasticity and good ductility. The preferred metals are titanium alloys. More preferably, the metal is from the group consisting of titanium alloyed with Al, Cb, Cr, Fe, Mo, Si, Sn, Ta, V, and/or Zr. The most preferred material to use for the metal liner of the tank of the present invention is Ti-6Al-4V.

The apparatus of the present invention is a composite overwrapped pressure vessel, comprising a liner made of a metal having a tensile yield strength in p.s.i. divided by tensile modulus of elasticity in p.s.i. ($F^{TY}/E$) of preferably at least 0.6% and having a ductility of preferably at least 5%, the liner including first and second dome portions and a cylinder portion, and a composite overwrap applied over the liner, wherein the vessel has a PV/W of at least 1.25 million inches. The metal is preferably a titanium alloy from the group consisting of: Ti-6Al-2Sn-4Zr-2Mo, Ti-5Al-2.5Sn, Ti-5Al-2.5Sn ELI, Ti-6Al-2Cb-1Ta-0.8Mo, Ti-8Al-1Mo-1V, Ti-11Sn-5Zr-2Al-1Mo, Ti-6Al-4V, Ti-6Al-4V ELI, Ti-6V-2Sn, Ti-3Al-2.5V, Ti-6Al-2Sn-4Zr-6Mo, Ti-6Al-2Sn-2Zr-2Mo-2Cr-0.25Si, Ti-5Al-2Sn-2Zr-4Mo-4Cr, Ti-13V-11Cr-3Al, Ti-3Al-8V-6Cr-4Mo4Zr, Ti-15V-3Al-3Cr-3Sn, and Ti-10V-2Fe-3Al. The term "ELI" stands for "extra low interstitial".

More preferably, the metal has a $F^{TY}/E$ of at least 0.7%, even more preferably at least 0.8%, even more preferably at least 0.9%, and most preferably at least 1.0%.

The ductility is more preferably at least 10%, even more preferably at least 15%, even more preferably at least 20%, even more preferably at least 25%, and most preferably at least 30%.

While other types of welds might work, the welding steps used to make the liner are preferably done with an autologous fusion process. More preferably, the welding process is electron beam welding, and most preferably, pulsed electron beam welding.

There is preferably an adhesive between the liner and the overwrap, and the adhesive is preferably a film adhesive. Preferably, the COPV includes a protective coating over the overwrap.

Preferably, the liner of the COPV of the present invention has a ratio of thickness in inches over diameter in inches of about $1.7 \times 10^{-3}$. Preferably, the liner of the COPV has a thickness of not more than 0.050", more preferably, not more than 0.040", and most preferably not more than 0.025". The ratio of the length of the cylinder to the diameter of the cylinder is preferably at least 1.00, more preferably at least 1.25, and more preferably greater than 1.25.

The overwrap can comprise a graphite/epoxy composite.

The present invention also comprises a method of manufacturing a composite overwrapped pressure vessel. The method preferably comprises the following steps:

(a) using spin forming, making a liner having first and second dome portions and a cylindrical portion made of a metal having a $F^{TY}/E$ of at least 0.6% and a ductility of at least 5%;

(b) forming first and second bosses made of the metal, the first boss being connected to the first dome portion and the second boss being connected to the second dome portion; and (c) applying a composite overwrap over the liner, applying filaments of the overwrap onto the liner.

Welding steps are preferably done with an electron beam weld process.

It is an object of the present invention to produce a COPV which, when used in spacecraft, launch vehicles, or aircraft, effects significant savings as compared to current COPV's.

It is an object of the present invention to produce a COPV with a high PV/W.

It is also an object of the present invention to produce a COPV with a liner made of a metal having a high $F^{TY}/E$ and a high ductility.

It is another object of the present invention to provide a method of producing a COPV with a high PV/W.

As used herein, including in the claims, PV/W stands for tank burst pressure in p.s.i. times volume of the tank in cubic inches, divided by the weight of the tank in pounds. PV/W is expressed in inches.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

in FIGS. 1A, 1B, and 1C, "STS" indicates stress. "PR" indicates proof, "STN" indicates strain, and "SI" indicates sizing; the plastic strain during MEOP cycles is indicated to be 0.7% for the copper plated liner and 0.3% for the aluminum liner;

FIGS. 3a through 3k are a schematic representation of the fabrication flow of the COPV of the present invention;

FIG. 4 is a graph showing the effect of heat treatment on ductility of the dome; more specifically, it shows the effect of the Heat Treat Temperature ("HTT") on dome metal on elongation ("E"), where "STN" represents strain, "SMS" represents strain at maximum stress, and "N" represents no heat treatment;

FIG. 5 is a graph comparing the elongation of TIG and EB welds, in which "STN" represents strain, "E" represents elongation, "SMS" represents strain at maximum stress, "EB/AW" represents electron beam as welded, "TIG/AW" represents TIG as welded, and "PB" represents previous baseline;

FIG. 6 is a graph showing data on oxygen surface contamination resulting from inadequate processing, normalized to 0.16% nominal, in which "DS" represents depth from surface;

FIG. 7 is a graph showing tensile strength ("TS") of the filament-wound overwrap as a function of temperature ("T");

FIG. 8 is a graph showing weight savings of the tank of the present invention over competitive tank technologies, in which "WS" represents weight savings, "AlL" represents aluminum lined. "SSL" represents SS lined, "LPTi T" represents low pressure titanium tank, "Ti L" represents Ti lined, "HPTi T" represents high pressure titanium tank, and "TT" represents type of tank;

FIG. 9 is a graph showing potential launch cost savings when using the COPV technology of the present invention, based on a 5000 psi pressure vessel, in which "CS" represents cost savings, "Al COPV" represents aluminum-lined COPV, "SL" represents steel-lined, "TV" represents tank volume (in cubic inches);

FIG. 10 is a graph showing potential launch cost savings when using the COPV technology of the present invention instead of low-pressure titanium tanks, in which "PCS" represents potential cost savings with the new technology and "TiTW" represents all titanium tank weight (in pounds);

FIG. 11 is a rear end view of the liner of the COPV of the present invention;

FIG. 12 is a side end view of the liner of the COPV of the present invention;

FIG. 13 is a cut-away side view of the liner of the COPV of the present invention;

FIG. 14 is a front view of the liner of the COPV of the present invention.

DETAILED DESCRIPTION OF THE PREFERRED EMBODIMENTS

Figure 1:
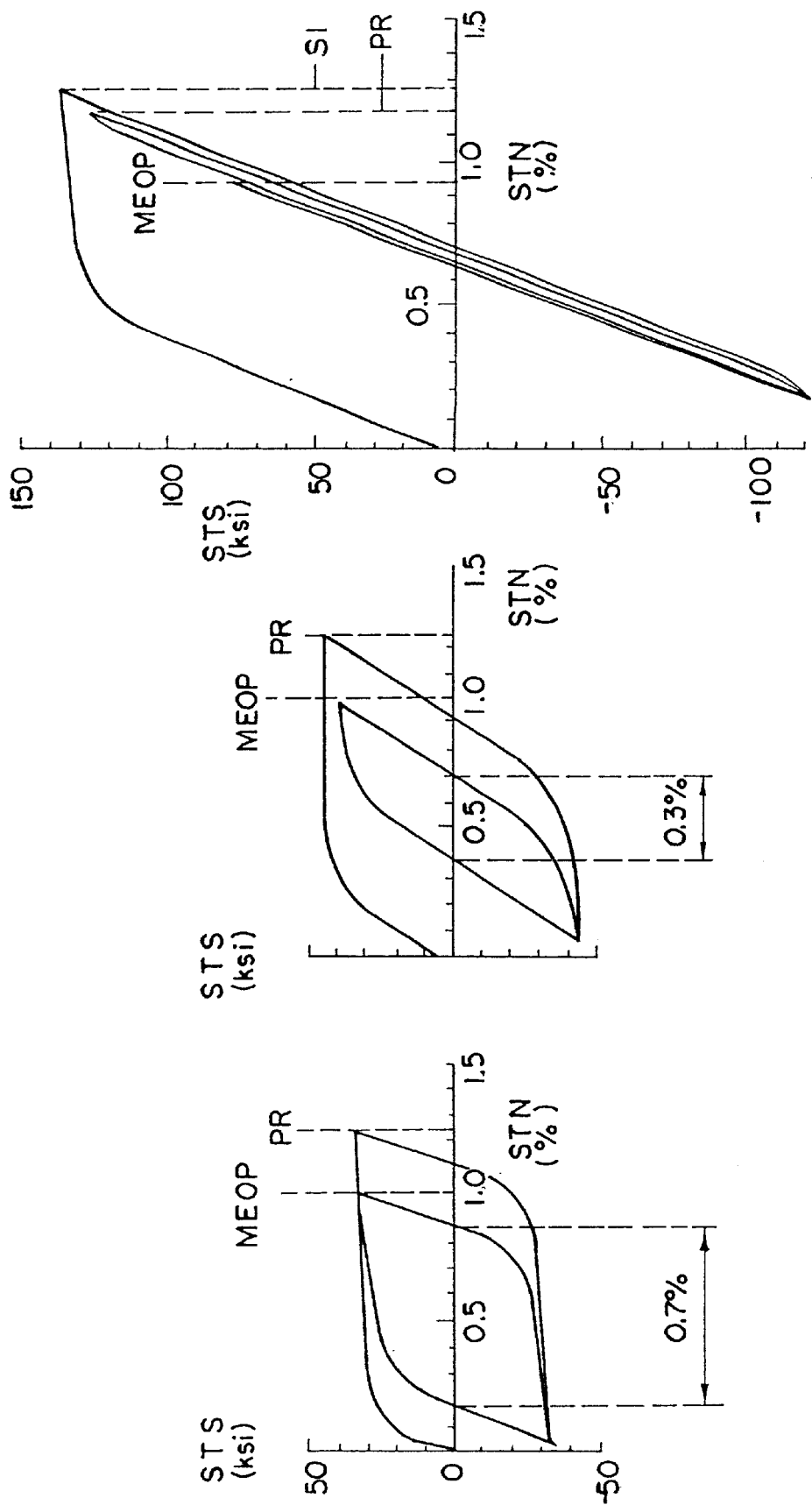
FIGS. 1A, 1B, and 1C show[s] a comparison of liners which undergo plastic deformation each cycle (copper-plated liner—FIG. 1A—and aluminum liner—FIG. 1B) as compared to an elastic liner (titanium-6AL-4V liner—FIG. 1C)

The following table lists the part numbers and part descriptions as used herein and in the drawings attached hereto. The preferred materials, if any, follow in parentheses.

| Part Number | Description |
| --- | --- |
| 10 | COPV of the first embodiment of the present invention |
| 20 | liner (titanium-alloy) |
| 20M | maximum thickness of domes 21, 23 |
| 21 | spun-formed dome (Ti-6Al-4V) |
| 22 | liner cylinder (Ti-6Al-4V) |
| 23 | spun-formed dome (Ti-6Al-4V) |
| 24 | machined boss (Ti-6M-4V) |
| 25 | machined tube (Ti-6Al-4V) |
| 26 | machined boss (Ti-6Al-4V) |
| 27 | fitting used to test tank |
| 28 | holes in boss 24 |
| 29 | holes in boss 26 |
| 30 | EB welds |
| 31 | preferred region for boss/dome weld |
| 40 | adhesive (AF-191) |
| 50 | filament-wound graphite-epoxy overwrap (T-1000/EPON 862-Curing Agent W) |
| 51 | graphite windings of filament-wound graphite-epoxy overwrap 50 |
| 60 | epoxy coating (EPON 862-Curing Agent W) |
| 120 | liner (titanium-alloy) |
| 120M | maximum thickness of domes 121, 123 |
| 121 | spun-formed dome (Ti-6Al-4V) |
| 123 | spun-formed dome (Ti-6Al-4V) |
| 124 | machined boss (Ti-6Al-4V) |
| 126 | machined boss (Ti-6Al-4V) |
| 130 | interface of cylindrical part of domes 21, 23, 121, 123 and non-cylindrical part thereof |

Figure 2:
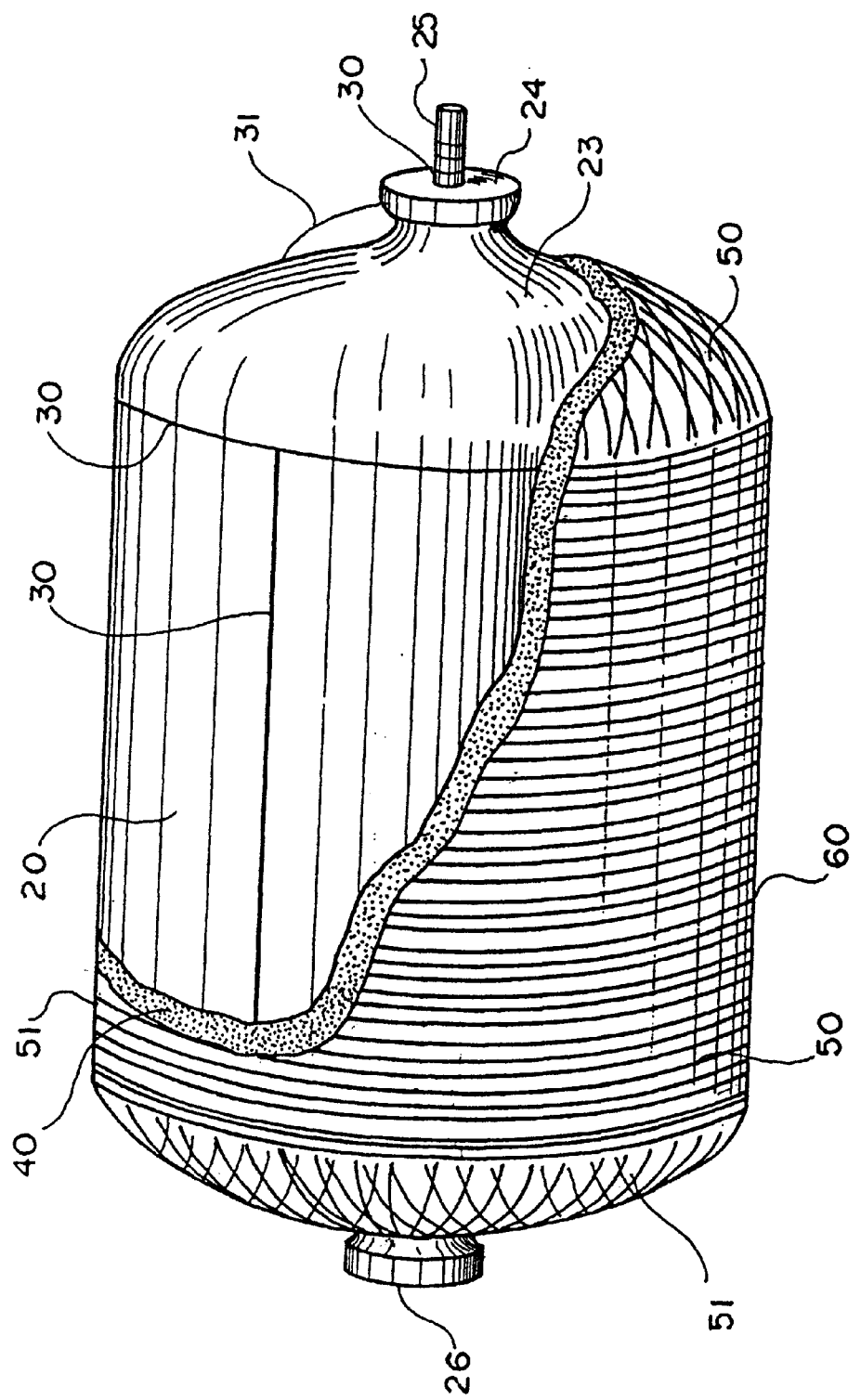
FIG. 2 is a perspective, partially cut-away view of the COPV of a first embodiment of the present invention.

The COPV of the first embodiment of the present invention, COPV 10, is shown in FIG. 2. COPV 10 includes a liner 20, a composite overwrap 50, an adhesive 40 bonding liner 20 to overwrap 50, and a protective epoxy coating 60 over the overwrap. The liner 20 includes preferably spun-formed domes 21 and 23 connected by a cylinder 22. The thickness of the liner is at a minimum at cylinder 22 and where domes 21 and 23 meet cylinder 22 and for some distance thereafter (see FIG. 13). The maximum thickness 20M of domes 21, 23 is adjacent their outer ends. This increased thickness helps to prevent premature rupture in this constrained area of the liner 20. Bosses 24 and 26 are attached to domes 23 and 21, respectively. Bosses 24 and 26 serve to provide a mechanism for structural attachment. Tube 25 is attached to boss 24 to provide a port for pressurization and de-pressurization. The tube fitting 27 serves to provide a mechanism for attachment to hydrostatic and pneumatic test equipment. It is typically removed after the vessel 10 is successfully tested. Holes 28 and 29 are either threaded or fitted with inserts to allow for structural attachment to tank 20. EB (electron beam) welds are designated at 30 in FIGS. 2, 12, and 13. Filament windings 51 of filament-wound graphite-epoxy overwrap 50 are run from dome 21 to dome 23 and concentrically around cylinder 22. The preferred area for attaching the bosses to the domes are indicated at 31 in FIG. 2.

One key feature of the present invention is the method of manufacturing of the liner. The approach used is novel in the industry and offers significantly improved performance and decreased cost. The key features of the preferred liner fabrication process are listed below.

The preferred liner approach is to 1) spin form domes 21 and 23 (see FIG. 3a), 2) machine bosses (end fittings) 24, 26 (FIG. 3b), 3) electron-beam weld tube 25 and domes 21, 23 to bosses 26, 24 and inspect (FIG. 3c); 4) form and electron beam weld cylinder 22 (FIG. 3d), and 5) weld the domes 21, 23 to the cylinder 22 (FIG. 3e). Each key operation had to be optimized for use in an overwrapped pressure vessel application, because the strain levels in the metal are well above yield, which non-composite overwrapped metal tanks are not designed to withstand. Several key points are discussed briefly below.

1. Spun Formed Domes—Spun titanium domes have not previously been used in composite overwrapped pressure vessels (although there is some history in using them in all titanium tanks). The use of spin forming significantly reduces cost and lead time over the prior art—primarily forging. To achieve the desired performance in an overwrapped tank application, special processing steps, namely spinning temperature, machining practices (i.e., machining after the heat treatment to remove all oxygen-enriched material from the domes), and heat treating, were implemented; the steps are above and beyond what is typical for titanium dome spinning for non-composite overwrapped tanks.

2. Formed and Welded Cylinder—Formed and welded cylinders have not previously been used in composite overwrapped pressure vessels (although there is some history in using them in all titanium tanks). Similarly to the domes, an optimum process had to be developed for the overwrapped pressure vessel application. The standard TIG weld process was abandoned for a pulsed electron beam weld process.

3. Assembly Welding—A liner fabricated with an assembly method of welding domes to cylinders has not been used for composite overwrapped pressure vessels. Electron beam welding was used in these operations also due to the high ductility and minimal distortion required of the weld in this application.

Several additional factors are key to the success of the vessel and are somewhat innovative in their own right, but are probably considered dependent claims to the primary innovation, i.e. the liner fabrication approach. Some of these are listed below 1. Bonding the liner to the overwrap. This should be done to achieve proper vessel performance. The approach of using a high performance film adhesive has been used before on metal lined pressure vessels, but is not prevalent and the present inventors are not aware of prior use with titanium. In fact, some metal lined pressure vessel manufacturers make sure the liner is not bonded to the composite overwrap.

2. The basic vessel design. In particular, the dome shape and thickness contour are important parameters to vessel performance. Also the configuration of the overwrap in the regions around end fittings and at the dome/cylinder interface is important. The present design is optimized; however the basic design approach is not foreign to the industry.

3. The materials and manufacturing process for the composite overwrap. The selection of materials and the composite manufacturing process are important components to the success of tank 10. The particular combination of fiber and resin may not have been used before, and the fabrication process of the present invention has some techniques (e.g., using filament winding and incrementally increasing the internal pressure of the liner 20) which make it work better.

4. The thickness of the liner. The 0.025" titanium liner 20 of the first embodiment of the COPV 10 of the present invention is significantly thinner than other titanium liners used previously, and thinner than typical aluminum liners. The thinner the liner, the higher the performance of the tank.

With the present invention, to make domes 21, 23, one preferably takes a plate, machines it down, then spins it over a male mandrel while heating and pressing down with a roller. Cylinder 22 is preferably made by rolling out of sheet metal.

The pressure vessel technology developed herein represents a significant advantage over the current state of the art.

The construction of the tank 10 of the first embodiment of the present invention is shown in FIG. 2. Tank 10 includes a thin titanium liner 20 with a filament-wound graphite-epoxy overwrap 50 as shown in FIG. 2. The chief attribute of the tank 10 is that the thin titanium liner 20 combined with the high-performance overwrap 50 yield a tank 10 which is of minimum weight. The ability to use the thin liner 20 depends on a good adhesive bond between the liner 20 and the overwrap 50 to prevent the titanium liner 20 from buckling due to the compressive stresses induced into the liner 20 after the first pressurization cycle. Previously, titanium liners were thicker, and did not require a bond between the liner and overwrap.

The primary innovative feature of the titanium liner 20 besides its minimum thickness is its method of fabrication. The method developed met two competing goals (a) low cost and short lead time and (b) high performance.

The performance demands for the titanium in overwrapped pressure vessels are much greater than in a typical titanium application. This is because the liner is yielded biaxially (i.e., the liner 20 stretches in two directions, as is typical in liners of high-performance COPVs when first pressurized with internal pressure) in the first pressurization cycle, after which it becomes prestressed (in compression) and performs elastically in subsequent operating cycles (see FIG. 1). During the course of the development of the technology, several failures were encountered due to manufacturing techniques that were not capable of fabricating a liner with the proper characteristics. Extensive development efforts were required to develop processes which could meet the performance requirements of this liner.

A discussion of the key components and assemblies involved in the subject invention follows. A schematic of the fabrication flow is shown in FIG. 3.

For dome fabrication, a spin-forming process was selected. Spin forming offered a low cost, readily available option for dome fabrication as compared to conventional forging technologies. Although spin forming in not a new process, the use of spin forming to form domes for overwrapped tanks is innovative, as well as is the complete dome-fabrication process. Initial attempts to use industry-standard spun-dome processing (developed for all metal tanks) proved inadequate for this application. The key steps to fabricating a dome are spin forming the dome, heat treating it, and machining it.

In spin forming the domes 21, 23, from the preferred alloy, Ti-6Al-4V, the spin forming temperature was a key parameter in the successful development. The domes 21, 23 are spun at a temperature of between about 800° F. and about 1600° F., and preferably at a temperature of approximately 1400° F. Sufficient thickness is maintained to allow (a) uniform metal temperature, and (b) removal of all oxygen-enriched material.

The spun domes 21, 23 are put through an anneal cycle which recrystallized the grain structure of the domes 21, 23. The domes 21, 23 are annealed by heating them to a temperature of between about 1300° F. and about 1700° F. (and preferably 1675° F.—see FIG. 4) for about 30–120 minutes, then cooling the domes 21, 23 to ambient temperature at a rate of not more than about 200° F. per minute. Most preferably, the domes 21, 23 are annealed per MIL-H-81200 at 1675° F. for one hour, then furnace cooled to 1400° F., then held for one hour and air cooled, or slower. For the preferred alloy, this anneal cycle is critical to remove the residual work hardening in the domes and significantly improves the ductility and fracture toughness of the liner. The effect of heat treatment on ductility of the dome is shown in FIG. 4.

After this heat treatment, the dome 21, 23 is machined to its final configuration. Machining is sufficient to insure that all oxygen-enriched material (from either spin forming or heat treatment) is removed.

The bosses, or end fittings, 24, 26 of the liner 20 are machined from Ti-6Al4V plate or bar stock.

Cylinder 22 is fabricated by rolling and electron-beam welding a pre-cut sheet of Ti-6Al-4V. Because of the thin sheet used, special pulsed electron-beam (EB) weld schedules were developed to produce consistent welds (i.e., a pulsed EB welding technique, well known to those skilled in this art, was used—specifically, the welds were made per AMS 2680 except that the internal maximum pore diameter did not exceed 0.2 times the thickness). The early cylinders were fabricated using a Tungsten Inert Gas (TIG) welding technique, which even after numerous refinements was not capable of consistently performing in this application. Therefore, TIG welds were abandoned in favor of the EB welds because of the superior ductile performance of the EB welds (FIG. 5).

The liner is assembled by EB welding. First the bosses 24, 26 are welded to the domes 21, 23. The bosses 24, 26 are first welded to the domes 21, 23, then the boss/dome assemblies are welded to the cylinder 22. Again, special pulsed EB weld schedules were developed for the dome-to-cylinder welds. Due to the high ductility of the EB welds 30, a post-weld high-temperature stress-relieve operation is not required. This is critical because even the best high-temperature vacuum stress-relieve operations produce a very thin layer of oxygen contamination (FIG. 6) which has been shown to crack under high strains (early tanks which were vacuum stress relieved exhibited cracks, some of which penetrated through the liner).

The adhesive and surface-preparation technique are essential to the success of this design concept. Once the liner 20 is complete, the surface is cleaned and abraded using a multi-step process to insure a good bond between the liner 20 and the composite overwrap 50. This process includes (FIG. 3f) (a) an alkaline clean, (b) an abrasive clean with abrasive pads and methyl-ethyl ketone (MEK), (c) solvent wipe with MEK, (d) an abrasive clean with abrasive pads and demineralized (DM) water, (e) a final DM water rinse and (f) "water break free" verification. Once the liner 20 is dry, the high-performance film adhesive 40, AF-191 manufactured by 3M, is applied (FIG. 3g). This surface preparation process in conjunction with the AF-191 adhesive 40 has been shown to produce very good bonds between titanium and graphite epoxy.

The liner 20 is then filament wound (FIGS. 3h and 3i) with T-1000GB graphite fiber (manufactured by Toray), and an EPON 862 epoxy resin/Curing Agent W mixture (manufactured by Shell Chemical Company). This combination has been shown to deliver outstanding tensile strength over a wide temperature range (FIG. 7). During the winding process, the developed process maintains proper tension on the graphite fiber and the proper ratio of fiber to resin as the material is applied to the tank. Techniques have also been developed for incremental pressurization of the liner 20 to prevent collapse of the liner 20 from the external pressure exerted by the filament-wound overwrap 50 (as discussed in the next paragraph).

The composite overwrap 50 consists of a high strength fiber (glass, carbon/graphite, aramid, etc.) and a polymeric resin system (polyester, epoxy, cyanate ester, etc.). Preferably, the fiber has a specific strength (tensile strength in p.s.i. over density in pounds per cubic inch) of greater than $7.5 \times 10^6$ inches, more preferably greater than $1.0 \times 10^6$ inches, and most preferably greater than $1.3 \times 10^6$ inches. The composite overwrap 50 is applied in layers using a technique called filament winding, whereby the liner 20 is rotated about its longitudinal axis and a pay-out eye moving up and down the longitudinal axis of the liner 20 dispenses the fiber (which has been coated with liquid resin by being passed through a resin bath) onto the liner. The layers are typically either wound circumferential on the cylindrical portion of the tank (hoop plies) or wound from end to end across the domes 21, 23 in a helical or planar fashion (planar or helical plies). During the winding process, the internal pressure of the liner 20 is incrementally increased to offset the forces applied to the liner 20 by the application of the overwrap 50. Once all the plies are applied to the liner, the tank 10 is cured. The curing process may take place at room temperature or at elevated temperatures, depending on the resin system selected and the end-use environments for the tank 10.

The tank overwrap can advantageously be cured as follows. (1) At an average rate of 1+/−0.5 degrees F. per minute, the part is raised to 160+/−10 degrees F. and held for 20–25 minutes. (2) Excess resin is removed after the 160 degree F. hold. The part temperature may drop as much as 20 degrees F. during resin removal. (3) At a rate of 1–10 degrees F. per minute, the temperature of the part is raised back to 160+/−10 degrees F. (4) At an average rate of 1+/−0.5 degrees F. per minute, the temperature of the part is raised to 200+/−10 degrees F. Excess resin is removed from the part surface. (5) At an average rate of 1+/−0.5 degrees F. per minute, the temperature of the part is raised to 250+/−10 degrees F. and held for 50–70 minutes. (6) At an average rate of 1 to 4 degrees F., the part or reference panel temperature (a reference panel may be used to determine temperature to prevent damage to the part by thermocouples) is raised to 350+/−10 degrees F. and held for 105–135 minutes. (7) At a rate not exceeding 5 degrees F. per minute, the part is cooled to below 150 degrees F.

A protective coating 60 can optionally be added after curing (see FIG. 3j).

COPV 10 is then internal cleaned for final acceptance, packaged, and shipped (FIG. 3k).

There are many variations of the winding process which may be employed. One such variation makes use of a "prepreg", which is fiber impregnated with resin and partially cured into a ribbon or band, in place of fiber impregnated with liquid resin. Another variation is to use more sophisticated equipment which physically places the fiber or prepreg band into place using computer-aided machinery—this process is generally referred to as "fiber placement" or "tape placement".

A test article was designed and fabricated to demonstrate the technology. For this activity, a new satellite program and Mil Std. 1522A requirements were selected because they (a) were typical for spacecraft applications for overwrapped tanks, and (b) the new satellite program was a potential application of the technology.

The primary goal of this program was to develop a tank design which met all requirements with sufficient margins, repeatable processing, and high quality materials.

The primary design drivers of this tank were the burst pressure and weight requirements. Structurally, the tank designed to meet burst pressure requirements was adequate for all other load cases (e.g. maximum expected operating pressure (MEOP)+vibration loads, MEOP+thermal, etc.). Other design considerations included: (a) cycle life; (b) the high-temperature environment (approximately 300° F.) encountered because of the proximity of the tank to a spacecraft engine, (c) mechanical interface requirements (as referenced in SCD 20032541, Rev. A); (d) vacuum outgassing requirements; (e) chemical resistance to hydrazine.

The fundamental design concept, a thin metal liner with a high-performance graphite/epoxy overwrap, was selected early in development trade studies. Graphite/epoxy, due to its high strength-to-weight ratio, was required for the overwrap to meet the weight requirements. Initially, three liner systems were considered, aluminum—the current state of the art, electroplated copper—a developmental technology with limited success in preliminary development with the potential for very low weight, and titanium alloy. The titanium alloy was selected over aluminum because it offered higher reliability and lower weight. The titanium was selected over electroplated copper because of the high design/fabrication risk associated with the copper lined tank development.

The basic design was defined by using netting analysis which provided the minimum quantity of both hoop (circumferential) and helical (end-to-end) plies for the overwrap and also defined the basic dome geometry. The basic details of the boss design and dome thickness profile were defined based on sound engineering principles. The overwrap configuration, specifically the termination of the hoop plies at the dome/cylinder interface, and the method of terminating helical plies in the boss region, were defined by a combination of sound engineering practice and conducting developmental testing of tanks under the Lockheed Martin IR&D program. The final details of the design were optimized using finite element analysis methods. Numerous parametric analyses were performed to arrive at the final configuration.

The basic tank 10 construction is shown in FIG. 2. The overwrap 50 is a filament-wound Toray T-1000GB graphite fiber and a Shell EPON 826/Curing Agent W epoxy resin system. The fiber was selected based on its extremely high strength-to-weight ratio. The resin system (for both winding and coating) was selected because it has (a) processing characteristics (viscosity, pot life, etc.) which are very suitable for filament winding, (b) high elongation (good translation of fiber properties), (c) good high-temperature performance (glass transition temperature is above 320° F.), (d) low condensable volatiles, and (e) good chemical resistance. The adhesive 40, 3M AF-191 brand film adhesive, was selected because it has (a) outstanding adhesion to both graphite epoxy and titanium, (b) high peel and shear strengths, (c) good high temperature performance up to 350° F., and (d) low condensable volatiles.

The titanium alloy, Ti-6Al-4V, was selected because of its high elastic capability. Unlike aluminum or copper, titanium alloy can remain elastic during operating cycles as shown in FIG. 1. This significantly increases cycle life and allows the use of standard linear elastic fracture mechanics to predict flaw growth and tank life.

All required validation testing for the technology program was successful. A brief description of all validation tests is listed below.

The test article configuration is as discussed above.

The tank was pressurized to 4830, −0, +30 psi., the volume was determined, the pressure was increased to 6030, −0, +30 psi. and held for 5 minutes for proof test, the tank pressure was decreased to 4830, −0, +30 psi. and the volume and dimensional growth measurements were recorded. The volume of the tank was 5086 in.$^3$, above the 4985±15 in.$^3$ requirement; which was not a technical concern. The permanent set was −0.02% (below the 0.2% maximum required) and the dimensional growth was acceptable.

To leak test the tank 10, it was placed in a vacuum bag attached to a helium leak detector. The bagged tank 10 was placed in an altitude chamber, and the chamber pressure was brought below one torr. The tank 10 was pressurized with helium to 4830, −0, +30 psi. After the tank pressure had been stabilized for 30 minutes, the leak rate was measured. The leak rate was $3.0 \times 10^{-8}$ scc/sec, within the $1.0 \times 10^{-6}$ scc/sec requirement.

Sine and random vibration testing were performed on a tank pressurized to 4,800 p.s.i. with helium according to the vibration levels shown below in Tables 1 and 2.

TABLE 1

Tank Sinusoidal Sweep Vibration Schedule

| Axis | Frequency Range (Hz) | Acceleration Level (G's) |
|---|---|---|
| X-Axis | 4–17 | 0.5" D.A. |
|  | 17–65 | 7.0 |
|  | 70–100 | 3.0 |
| Y and Z Axes | 2–20 | 0.5" D.A. |
|  | 20–80 | 10.0 |
|  | 85–100 | 4.0 |

TABLE 2

Tank Random Vibration Schedule

| Frequency Range (Hz) | Slope (dB/Oct.) | Power Spectral Density (G²/Hz) |
|---|---|---|
| 20 | | .00246 |
| 20–100 | +6.0 | |
| 100–1000 | | .06 |
| 1000–2000 | −6.0 | |
| 2000 | | .015 |

MEOP cycling was conducted by pressurizing tank 10 to 4830 psi minimum a total of 50 times. This meets the MIL-STD-1522A minimum requirement of 50 cycles since 4 times the maximum number of operating cycles is less than 50 (actual is 4×10=40). Forty-two of those cycles were done consecutively, and the other 8 were accomplished as follows: (a) two during leak checks (one after proof and one prior to burst), (b) three during vibration testing (the tank was pressurized and de-pressurized for each axis of vibration testing, (c) one during thermal cycling, (d) one during de-tanking, and (e) one during final volumetric check. There was no indication of tank failure as a result of the MEOP cycles.

Proof cycling was conducted by cycling tank 10 to 6030 psi. six times. One cycle as accomplished during the initial proof test, and 5 additional cycles were done consecutively. There was no indication of tank failure as a result of the proof cycles.

Thermal cycling was conducted by pressurizing tank 10 with helium to 4080 psi this pressure was chosen so the tank would not exceed MEOP at maximum temperature) and placing it in a computer-controlled temperature chamber. The chamber was cycled 10 times from −29° F. to +178° F., holding at each temperature extreme for 2 hours. The overall test objectives were met and the test was successful.

A de-tanking test was also performed. The purpose of the de-tanking test was to verify the tank could withstand the external heat encountered during service while the tank is being de-pressurized. Because of the difficulty in simulating the exact tank surroundings, accurately monitoring and controlling a heat source based on heat flux, and not being able to simulate the effects of a no-gravity environment, the tank test was devised to monitor and control tank temperature, as predicted by analysis, rather than perform an exact simulation. A margin of 18° F. was added to the maximum temperature for test purposes to account for any inaccuracies in the analysis.

The test was a three-stage blow down of the tank where the mass flow out of the tank was regulated at 0.001 lbm/sec and the temperature of the tank was raised using heater pads bonded to the appropriate areas of the tank. There were two 50-minute de-pressurization cycles and one 22-minute cycle. Between cycles, initial tank and chamber temperatures were restored. The tank temperatures were maintained to within a few degrees of the predictions (with final maximum temperatures always meeting or exceeding predictions) and the mass flow rate was easily maintained between 0.0009 and 0.0011 lbm/sec. At the end of the final 22-minute de-pressurization cycle, the tank pressure was 750 psi, the maximum tank temperature in the center of the heated section was 275.6° F., and the minimum temperature on the tank cylinder directly opposite the heated part of the tank was 67.3° F. At this point the heaters were turned off and the tank was allowed to continue to de-pressurize at 0.001 lbm/sec to 400 psi., at which time the maximum tank temperature was 147.8° F. The tank was subsequently completely de-pressurized, at which time the maximum temperature was 94.1° F.

The de-tanking test was successful and there was no detectable damage to the tank.

To conduct a leak check, the tank was placed in a vacuum bag attached to a helium leak detector. The bagged tank was placed in an altitude chamber and the chamber pressure was brought below one torr. The tank was pressurized with helium to 4830, −0, +30 psi. After the tank pressure had been stabilized for 30 minutes, the leak rate was measured. The leak rate was $1.4 \times 10^{-7}$ scc/sec, within the $1.0 \times 10^{-6}$ scc/sec requirement.

Regarding volumetric expansion, the tank was pressurized to 4830, −0, +30 psi. and the tank volume was measured. The tank volume was 5112 in.$^3$ at the end of the qualification as opposed to 5086 in.$^3$ during the initial measurement. This does indicate some minor tank growth during the qualification program, however, this is not a major concern. It should be noted that although efforts were made to eliminate air from the system, small amounts of trapped air (e.g. from air bubbles suspended in pressurization media, bubbles clinging to tank inner surface, or air trapped in the tank of pressurization system) may have contributed the perceived variance in volume.

Burst Test and Failure Mode Discussion

The tank was pressurized to 7230 psi., held for 15 seconds, then pressurized to failure, which occurred at 9339 psi.

The exact mode of failure cannot be determined because, despite efforts to suspend the tank with elastic cords to prevent secondary damage, there was significant secondary damage to the tank which masked the exact failure initiation site.

The failure scenario, as constructed from examination of the failed article and video tape, occurs as follows.

(1) There was a failure in the dome region of the tank on the end with the pressure inlet. This is evidenced by a visual indication of water in the video. The impulse of this failure instantly sheared the bolts holding the tank to the plates attached to the elastic cords. (It is known that the bolts were sheared because the plate to which the tank was attached at the failure initiation end did not move with the tank and the scar from the impact of the opposite boss opposite on the other mounting plate to which it was attached is not concentric to the bolt pattern.)

(2) The tank was propelled into the wall opposite the failure location which imploded the dome opposite the failure and exploded the dome where the failure initiated.

(3) The entire boss and upper portion of the dome from the failure initiation end of the tank (to a diameter of approximately 8") was separated from the tank after the tank impacted the wall. Also there was extensive fiber and liner damage in both domes.

Although there is no way to be certain exactly what happened, it is likely that the failure initiated in the liner dome at a radius of approximately 4" from the longitudinal centerline. Stress analysis shows this is the region where there is extensive yielding of the liner and that the strains at burst pressure are over 4.4% in the meridional direction and 1.4% in the hoop direction, which are sufficient to fail the metal. In a previous development test of an identical tank which achieved a similar pressure (9368 psi) and did not fail catastrophically (it failed by fiber failure in outer hoop plies only—the remainder of the overwrap and liner remained intact), there was visible indication of extreme yielding in this region.

The initial failure probably released a propulsive jet of water which failed the bolts holding the tank in the elastic-cord-supported fixture and propelled the tank into the wall, thereby creating the extensive secondary damage.

Although failure above 9000 psi. is considered a burst, previous development tanks of essentially identical overwrap configuration (same exact configuration of the six helical plies but had two fewer hoop plies, 16 as opposed to the current 18), but with different liner designs leaked at above 6800 psi. In one of these tanks, the liner had a different design in the boss and dome region and failed at 6870 psi. with a large crack in the dome (at approximately 7.5" diameter from longitudinal axis), which only leaked—this was a pneumatic test with nitrogen. In another test of the present liner design with a different longitudinal cylinder weld, a tank leaked at above 6800 psi by cracking along the entire length longitudinal cylinder weld, (this weld was a TIG weld which was used only in development and abandoned prior to fabrication of flight or final technology validation tanks). This demonstrates that the tank overwrap design is sufficient to produce leak before burst failures in liner failures below 6800 psi, which encompasses MEOP (4800 psi) and Proof pressure (6000 psi).

Extensions of Innovation

The technology discussed herein could be extended to a tanks of a variety of sizes, shapes, and pressure requirements. In addition, other metals, such as other titanium alloys, Inconel, or Stainless steel could be used as the liner material with similar results. Similarly, other fibers, resins, and adhesives may be used with similar results.

Advantages Over Prior Practices

This technology offers cost-effective performance enhancement to a number of applications where weight is critical. Some of the specific advantages are significantly lower weight, short lead time, high cyclic life potential, and cost-effective performance enhancement. These advantages are discussed in detail below.

The typical weight reduction is about 20% over competitive aluminum-lined tanks and 40% over comparable steel-lined tanks or titanium-lined tanks, 40% over low-pressure titanium tanks, and 60% over high-pressure titanium tanks as shown in FIG. 8. The key tank attributes which allow weight reduction are the high-strength/low-density fiber and the high-strength, thin titanium-alloy liner. The use of titanium alloy offers additional benefits over aluminum in that it is much stronger and stiffer per unit weight; this is a particular advantage in the polar boss regions of the dome where the liner is required to withstand high structural loads. Reduced tank weight offers many potential advantages to satellite/spacecraft applications, including:

a) Ability to deliver a larger payload. Satellite propulsion busses and launch vehicles can deliver a finite mass to the proper orbit. Reduction of the mass of the tanks allows more mass for the electronics or other components of the spacecraft.

(b) Increased life on orbit. Satellites must expend propellant in some type of thrust-producing engine to maintain a proper orbit. Satellite life is limited by the amount of propellant which the spacecraft can deliver to orbit. Reducing tank weight can increase the amount of propellant taken to orbit, and therefore increase the life of the satellite.

(c) Reduced launch costs. As the mass of the spacecraft increases, so does the size and cost of the launch vehicle required to launch the spacecraft. Reduction in tank weight can mean the difference in launching with one class of launch vehicle versus another, which can mean dramatic differences in launch costs. In addition, some launches are priced on a per-pound basis, so every pound can save $5000 to $15,000 or more. FIGS. 9 and 10 show potential launch cost savings associated with implementation of the subject technology into both high-pressure COPVs and low-pressure titanium-tank applications.

Typical lead time for tank 10, from start to finish is about 4 to 6 months, as compared to a tank with a forged titanium liner which would be typically 12 to 18 months.

Because the liner 20 remains elastic during operating cycles, the technology has capability for much higher cyclic life than an aluminum-lined tank. The high cyclic life capability offers the potential to use this technology in applications where much heavier tanks are currently used.

When compared to aluminum-lined tanks, tank 10 offers a cost-effective alternative in that although acquisition costs may be higher, the total cost, once launch savings are factored in, is lower.

When compared to other titanium-lined or steel-lined technologies, the COPV 10 of the present invention offers cost savings in both acquisition costs and launch costs.

The technology of the present invention is a breakthrough in weight and cost efficiency for COPVS. The technology, utilizing a thin titanium liner, (utilizing spinning technology, off-the-shelf materials, and electron-beam welding) combined with a high-performance graphite/epoxy overwrap, offers the following advantages:

1. At least a 20% weight savings over traditional aluminum-lined vessels with comparable lead time and availability.

2. Cost-effective performance enhancement over aluminum-lined vessels for launch vehicle/spacecraft applications. For example, for a typical 4800 psi., 5000 in.$^3$ vessel, the acquisition cost of the vessel would be about $30,000 higher than a comparable aluminum-lined COPV, but the launch cost savings would be $50,000 to $90,000, producing an overall savings of $20,000 to $60,000 per launch. Alternatively, the weight savings could be translated into increased payload capability, e.g. increased transponders for communications satellites. This increases the revenue potential of the satellite by increasing capacity to transfer information and data.

3. Approximately 40 to 45% weight savings over comparable technologies for multi-use tanks, such as those used on the Space Shuttle. If implemented on Space Station, the number of launches required could be reduced or the capability increased.

4. Approximately 30 to 50% cost savings and a 50% or greater reduction in lead time over prior technologies (e.g. forged/machined liners). These features are critical in the very competitive commercial satellite market.

COPV 10 can be, for example, 16 inches in diameter by 32 inches long to 24 inches in diameter to 102 inches long. It is believed that it would be practical to make the diameter up to, for example, 36 inches, with a length of 36 to 120 inches. The ratio of liner length to tank diameter (around 0.75–1.0, more preferably around 1.0–1.4, and most preferably around 1.4–2.0+) would probably be fairly constant, regardless of the size, as would the ratio of liner thickness (in inches) to liner diameter (also in inches) (preferably not more than about $1.7 \times 10^{-3}$, more preferably not more than about $1.5 \times 10^{-3}$, even more preferably not more than about $1.3 \times 10^{-3}$, and most preferably not more than about $8.5 \times 10^{-4}$,). The thickness of the overwrap 50 will depend upon the desired pressure. The maximum thickness of domes 21 and 23 can be, for example, about twelve times the minimum thickness of domes 21 and 23 (to prevent failure near the outer ends of the domes 21 and 23, the thickness of domes 21 and 23 needs to be increased near the outer ends, as shown in FIG. 13).

Exemplary dimensions for the COPV 10 of the present invention are as follows:

- diameter of cylinder 22 and inner ends of domes 21 and 23: 16.0 inches;
- length of cylinder 22: 19.9 inches;
- length of domes 21 and 23: 6.3 inches;
- length of COPV 10 (from outer end of boss 24 to outer end of boss 26): 32.3 inches;
- thickness of cylinder 22 and domes 21 and 23 adjacent the inner ends of domes 21 and 23: 0.025 inch;
- maximum thickness of domes 21 and 23: 0.300 inch;
- average thickness of overwrap 50: 0.25 inch;
- minimum thickness of overwrap 50: 0.10 inch;
- maximum thickness of overwrap 50: 0.60 inch;
- the hoop plies can advantageously be wound at 8 tows per 0.58+/−0.010 inches tow spacing;
- the helical plies can advantageously be wound at 8 tows per 0.55+/−0.010 inches tow spacing;
- with these exemplary dimensions, the plies can terminate as shown in Table 3;
- weight of liner 20: 10 pounds;
- burst pressure of COPV 10: about 9,300 p.s.i.;
- volume of COPV 10: 5,000 cubic inches;
- weight of COPV 10: 32 pounds;
- PV/W for COPV 10: 1.45 million inches (for a comparable COPV made with an aluminum liner, it is 1.0 million inches);
- $F^{TY}/E$ of liner 20: 0.8%;
- ductility of liner 20: 10%.

Domes 21, 23 can, for example, vary in thickness from about 0.300 inch near the inlet opening to 0.025 inch where it is welded to the cylinder (in such a case, the cylinder is preferably 0.025 inch thick as well). Domes 21, 23 should be thicker near the inlet opening to prevent premature rupture.

The composite overwrap can, for example, consist of 24 plies applied as shown in Table 3 (ply 1 being applied first and ply 24 being applied last). Each ply is composed of a number of individual fibers aligned at an angle indicated in Table 3.

TABLE 3

| Ply | Angle (In Degrees) with Respect to Longitudinal Axis of Cylinder | Location (In Inches) of Termination of Ply at Each End |
|---|---|---|
| 24 | 88–92 | 1.000 + .00, −.20 towards the center from a reference line spaced .300 + .20 − .00 towards the center from the interface (indicated at 130 in FIG. 15) of the cylindrical portion and the elliptical portion of the dome |
| 23 | 88–92 | .750 + .00, −.20 towards the center from a reference line spaced .300 + .20 − .00 towards the center from the interface (indicated at 130 in FIG. 15) of the cylindrical portion and the elliptical portion of the dome. |
| 22 | 88–92 | .500 + .00, −.20 towards the center from a reference line spaced .300 + .20 − .00 towards the center from the interface (indicated at 130 in FIG. 15) of the cylindrical portion and the elliptical portion of the dome |
| 21 | 88–92 | .250 + .00, −.20 towards the center from a reference line spaced .300 + .20 − .00 towards the center from the interface (indicated at 130 in FIG. 15) of the cylindrical portion and the elliptical portion of the dome |
| 20 | 11–19 | adjacent the bosses, along a circle of radius 2.80 inches, centered on the longitudinal axis of the liner |
|  | 88–92 | .500 + .00, − .20 towards the center from a reference line spaced .300 + .20 − .00 towards the center from the interface (indicated at 130 in FIG. 15) of the cylindrical portion and the elliptical portion of the dome |
| 18 | 88–92 | .250 + .00, − .20 towards the center from a reference line spaced .300 + .20 − .00 towards the center from the interface (indicated at 130 in FIG. 15) of the cylindrical portion and the elliptical portion of the dome |
| 17 | 88–92 | .250 + .00, −.20 towards the center from a reference line spaced .300 + .20 − .00 towards the center from the interface (indicated at 130 in FIG. 15) of the cylindrical portion and the elliptical portion of the dome |
| 16 | 10–17 | adjacent the bosses, along a circle of radius 2.20 inches, centered on the longitudinal axis of the liner |
| 15 | 88–92 | .300 + .20 − .00 towards the center from the interface (indicated at 130 in FIG. 15) of the cylindrical portion and the elliptical portion of the dome |
| 14 | 88–92 | .250 + .00, −.20 towards the center from a reference line spaced .300 + .20 − .00 towards the center from the interface (indicated at 130 in FIG. 15) of the cylindrical portion and the elliptical portion of the dome |
| 11 | 88–92 | .300 + .20 − .00 towards the center from the interface (indicated at 130 in FIG. 15) of the cylindrical portion and the elliptical portion of the dome |
| 12 | 10–17 | adjacent the bosses, along a circle of radius 2.20 inches, centered on the longitudinal axis of the liner |
| 10 | 88–92 | .250 + .00, − .20 towards the center from a reference line spaced .300 + .20 − .00 towards the center from the interface (indicated at 130 in FIG. 15) of the cylindrical portion and the elliptical portion of the dome |
| 10 | 88–92 | .300 + .20 − .00 towards the center from the interface (indicated at 130 in FIG. 15) of the cylindrical portion and the elliptical portion of the dome |
| 9 | 8–13 | adjacent the bosses, along a circle of radius 1.80 inches, centered on the longitudinal axis of the liner |
| 8 | 88–92 | .250 + .00, −.20 towards the center from a reference line spaced .300 + .20 − .00 towards the center from the interface (indicated at 130 in FIG. 15) of the cylindrical portion and the elliptical portion of the dome |
| 7 | 88–92 | the interface (indicated at 130 in FIG. 15) of the cylindrical portion and the elliptical portion of the dome |
| 6 | 88–92 | .300 + .20 − .00 towards the center from the interface (indicated at 130 in FIG. 15) of the cylindrical portion and the elliptical portion of the dome |
| 5 | 7–12 | adjacent the bosses, along a circle of radius 1.80 inches, centered on the longitudinal axis of the liner |
| 4 | 88–92 | the interface (indicated at 130 in FIG. 15) of the cylindrical portion and the elliptical portion of the dome |
| 3 | 88–92 | .300 + .20 − .00 towards the center from the interface (indicated at 130 in FIG. 15) of the cylindrical portion and the elliptical portion of the dome |
| 2 | 88–92 | the interface (indicated at 130 in FIG. 15) of the cylindrical portion and the elliptical portion of the dome |
| 1 | 6–10 | adjacent the bosses, along a circle of radius 1.80 inches, centered on the longitudinal axis of the liner |

The typical length of cylinder 22 is 1.25 times its diameter. Typically, the cylinder 22 encloses 75% of the volume, but has only 25% of the weight—thus, to improve PV/W, one can make the cylinder 22 longer.

The composite overwrap takes most of the load. The portion of domes 21, 23 near the inlet opening is thicker to take most of the load. When a titanium alloy is used for the liner 20, the COPV 10 of the present invention has a longer cycle life than comparable aluminum-lined tanks (see FIG. 1).

The present invention can be used as pressurant tanks for satellites and spacecraft and as fuel and oxidizer tanks for satellites and spacecraft.

Vehicles/spacecraft applications which require tanks which could directly use this technology include: (1) various satellites (pressurant, fuel and oxidizer), (2) Space Station (life support and station reboost), (3) Space Shuttle (Life support, orbital maneuvering), (4) Re-useable Launch Vehicle (life support, primary/secondary fuel/oxidizer tank pressurization, secondary fuel and oxidizer), (5) Hybrid Rockets (oxidizer tank pressurization), (6) Space Station/Shuttle Extra-Vehicle Activity—Pressurized gas proposed as propulsion media for most applications (manned and unmanned).

Figure 15:
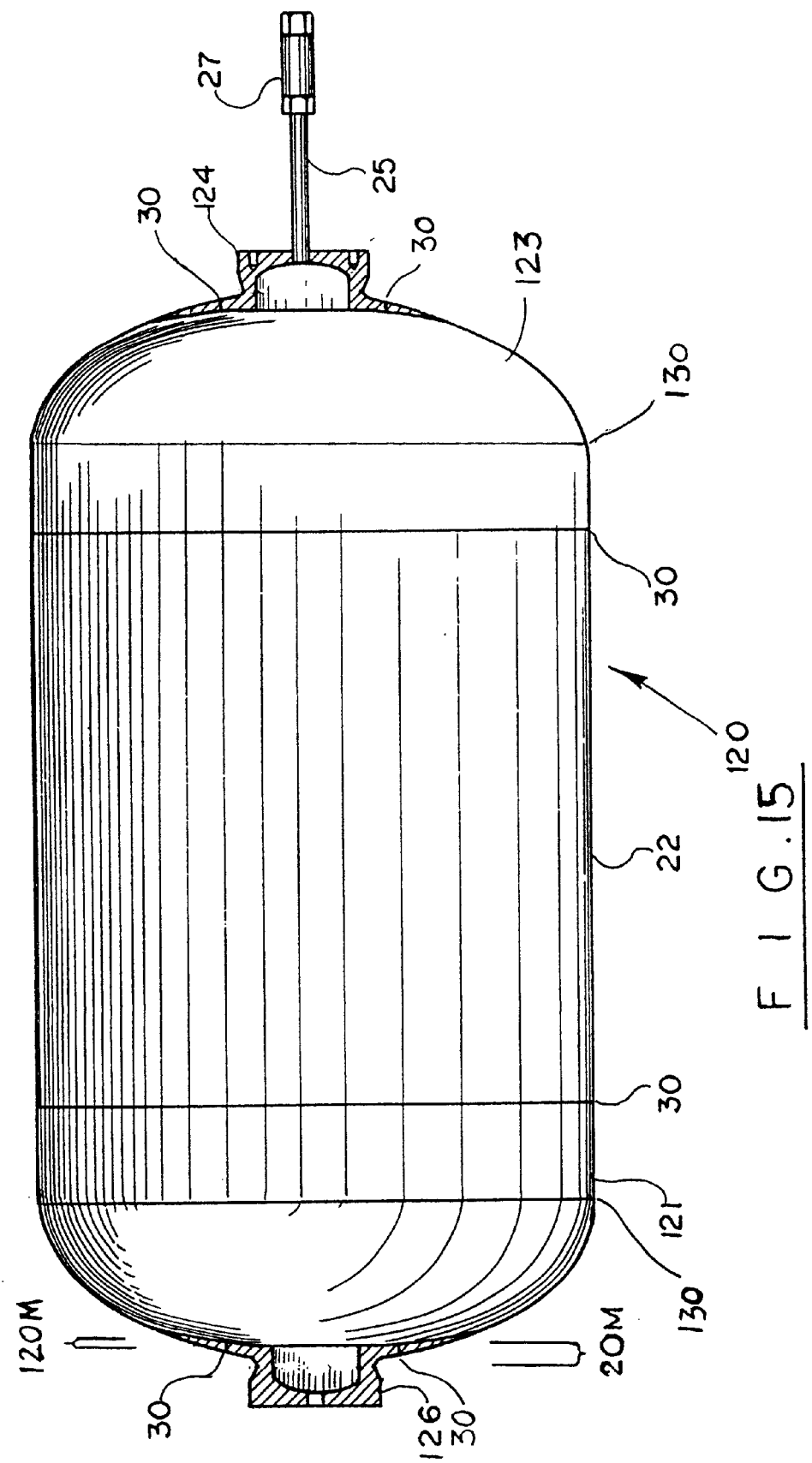
FIG. 15 is a cut-away side view of the liner of the COPV of the preferred embodiment of the present invention.

FIG. 15 shows the preferred embodiment of the liner of the present invention, liner 120. Liner 120 is similar to liner 20, except for the location of the welds connecting the bosses to the domes. Liner 120 can advantageously be substituted for liner 20 in the COPV 10 of the present invention.

Liner 120 can be produced at a cost of about 30% less than the cost of liner 20, without adversely affecting performance of the liner. The reason for this is that a machining and inspection step between spinning and annealing of the domes is eliminated and the location of the weld between the dome and the boss is changed.

The machining and inspection step which is eliminated was initially planned into the program to determine if there was any cracking of the spun domes before they were annealed and final machined. After processing of many domes, there has never been any indications of cracking at this step, so it is eliminated in the construction of liner 120.

As can be seen by reviewing FIG. 13 and FIG. 15, the welds between dome 21 and boss 26 and between dome 23 and boss 24 have a plane parallel to the plane of the welds between these domes 21 and 23 and cylinder 22, while the welds between dome 121 and boss 126 and between dome 123 and boss 124 are cylindrical and are parallel to cylinder 22 (i.e. the interface between the boss and the dome at the weld is cylindrical), Movement of the weld location is beneficial because it allows the thickness of the starting plate from which the domes are machined to be reduced from about 0.90" (20M in FIGS. 13 and 15) to about 0.375" (120M in FIG. 15) when a tank having the exemplary dimensions is made. Also, a lot of pre-machining of the domes is eliminated. The weld locations between boss 124 and dome 123 and between boss 126 and dome 121 of liner 120 remains elastic, even at burst pressures; these weld locations are at approximately the same strain level as the welds of liner 20 between the bosses and the domes.

Though the liners 20 and 120 have been described as being made with three major separate components (domes 21, 23 and cylinder 30 or domes 121, 123, and cylinder 30), they could be made by spin forming a single major component or by spin forming two major components, each containing a dome portion and half (or some portion) of a cylinder portion.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A composite overwrapped pressure vessel, comprising:
   (a) a liner made of a metal having a tensile yield strengthened p.s.i./tensile modulus of elasticity in p.s.i.(FTY/E) of at least 0.6% and a ductility of at least 5%, the liner including first and second dome portions and a cylinder portion; and
   (b) a composite overwrap applied over the liner,
   wherein the vessel has a PV/W (burst pressure in p.s.i. times volume in cubic inches, divided by weight in pounds) of at least 1.05 million inches.

2. The vessel of claim 1, wherein the composite overwrapped pressure vessel has a PV/W of at least 1.25 million inches.

3. The vessel of claim 1, wherein the composite overwrapped pressure vessel has a PV/W of at least 1.45 million inches.

4. The vessel of claim 1, wherein the metal is a titanium alloy from the group consisting of: Ti-6Al-2Sn-4Zr-2Mo, Ti-5Al-2.5Sn, Ti-5Al-2.5Sn ELI, Ti-6Al-2Cb-1Ta-0.8Mo, Ti-8Al-1Mo-1V, Ti-11Sn-5Zr-2Al-1Mo, Ti-6Al-4V, Ti-6Al-4V ELI, Ti-6V-2Sn, Ti-3Al-2.5V, Ti-6Al-2Sn-4Zr-6Mo, Ti-6Al-2Sn-2Zr-2Mo-2Cr-0.25Si, Ti-5Al-2Sn-2Zr-4Mo-4Cr, Ti-13V-11Cr-3Al, Ti-3Al-8V-6Cr-4Mo-4Zr, Ti-15V-3Al-3Cr-3Sn, and Ti-10V-2Fe-3Al.

5. The vessel of claim 4, wherein the titanium alloy is Ti-6Al-4V.

6. The vessel of claim 1, wherein the metal has a FTY/E of at least 0.7%.

7. The vessel of claim 1, wherein the metal has a ductility of at least 10%.

8. The vessel of claim 1, wherein welding steps are used to make the liner and are done with an electron beam weld process.

9. The vessel of claim 1, further comprising:
   an adhesive between the liner and the overwrap.

10. The vessel of claim 9, wherein the adhesive is a film adhesive.

11. The vessel of claim 1, further comprising a protective coating over the overwrap.

12. The vessel of claim 1, wherein the liner of the composite overwrapped pressure vessel has a ratio of thickness in inches over diameter in inches of about 1.7×10−3.

13. The vessel of claim 1, wherein the liner of the composite overwrapped pressure vessel has a thickness of not more than 0.025".

14. The vessel of claim 1, wherein the dome portions are made by spin forming.

15. The vessel of claim 1, wherein the overwrap comprises a graphite/epoxy composite.

16. The vessel of claim 1, wherein the ratio of the length of the cylinder to the diameter of the cylinder is at least 1.00.

17. The vessel of claim 1, wherein each dome portion includes a boss portion welded thereto with a cylindrical interface between the boss portion and the dome portion.

18. The vessel of claim 8 wherein said liner is welded using a pulsed electron beam.

19. The vessel of claim 1 wherein said dome portions comprise a maximum thickness at said cylindrical interface.

20. A liner for composite overwrapped pressure vessel, comprising:
   (a) first and second dome portions made by spin forming and a cylindrical portion made of a metal having a tensile yield strengthened p.s.i./tensile modulus of elasticity in p.s.i.(FTY/E) of at least 0.6% and a ductility of at least 5%;

(b) a boss made of the metal, the boss being connected to the first dome portion.

21. A liner for a composite overwrapped pressure vessel, the liner being made of a metal having a tensile yield strengthened p.s.i./tensile modulus of elasticity in p.s.i. (FTY/E) of at least 0.6% and a ductility of at least 5%, the liner including first and second dome portions and a cylinder portion, wherein, when a composite overwrap is applied over the liner to produce a composite overwrapped pressure vessel, the vessel has a PV/W (burst pressure in p.s.i. times volume in cubic inches, divided by weight in pounds) of at least 1.05 million inches.

22. The liner of claim 21, wherein the composite overwrapped pressure vessel has a PV/W of at least 1.25 million inches.

23. The liner of claim 21, wherein the composite overwrapped pressure vessel has a PV/W of at least 1.45 million inches.

24. The liner of claim 21, wherein the metal is a titanium alloy from the group consisting of: Ti-6Al-2Sn-4Zr-2Mo, Ti-5Al2.5Sn, Ti-5Al-2.5Sn ELI, Ti-6Al-2Cb-1Ta-0.8Mo, Ti-8Al-1Mo-1V, Ti-11Sn-5Zr-2Al-1Mo, Ti-6Al-4V, Ti-6Al4V ELI, Ti-6V-2Sn, Ti-3Al-2.5V, Ti-6Al-2Sn-4Zr-6Mo, Ti-6Al-2Sn-2Zr-2Mo-2Cr-0.25Si, Ti-5Al-2Sn-2Zr-4Mo-4Cr, Ti-13V-11Cr-3Al, Ti-3Al-8V-6Cr-4Mo-4Zr, Ti-15V-3Al-3Cr-3Sn, and Ti-10V-2Fe-3Al.

25. The liner of claim 24, wherein the titanium alloy is Ti-6Al-4V.

26. The liner of claim 21, wherein the metal has a FTY/E of at least 0.7%.

27. The liner of claim 21, wherein the metal has a ductility of at least 10%.

28. The liner of claim 21, wherein welding steps are used to make the liner and are done with an electron beam weld process.

29. The liner of claim 21, having a ratio of thickness in inches over diameter in inches of about $1.7 \times 10^{-3}$.

30. The liner of claim 21, having a thickness of not more than 0.025".

31. The liner of claim 21, wherein the dome portions are made by spin forming.

32. The liner of claim 21, wherein the ratio of the length of the cylinder to the diameter of the cylinder is at least 1.00.

33. The liner of claim 21, wherein each dome portion includes a boss portion welded thereto with a cylindrical interface between the boss portion and the dome portion.

* * * * *